US009917651B2

(12) United States Patent
Puleri et al.

(10) Patent No.: US 9,917,651 B2
(45) Date of Patent: Mar. 13, 2018

(54) FEED SIGNAL GENERATION FOR A PHASED ARRAY ANTENNA

(71) Applicant: Telefonaktiebolaget LM Ericsson (publ), Stockholm (SE)

(72) Inventors: Marzio Puleri, Pisa (IT); Antonio D'Errico, Pisa (IT); Anna Molony, Warwick (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/320,470

(22) PCT Filed: Jul. 1, 2014

(86) PCT No.: PCT/EP2014/063994
§ 371 (c)(1),
(2) Date: Dec. 20, 2016

(87) PCT Pub. No.: WO2016/000767
PCT Pub. Date: Jan. 7, 2016

(65) Prior Publication Data
US 2017/0163351 A1  Jun. 8, 2017

(51) Int. Cl.
*H04B 10/50* (2013.01)
*H04B 10/64* (2013.01)
(Continued)

(52) U.S. Cl.
CPC ............... *H04B 10/64* (2013.01); *G01S 7/02* (2013.01); *H01Q 3/2676* (2013.01);
(Continued)

(58) Field of Classification Search
CPC .......... H04B 10/50; H04B 10/64; G01S 7/02; G01S 13/02; H01Q 3/26; H01Q 21/22; H04L 7/00
(Continued)

(56) References Cited

U.S. PATENT DOCUMENTS 5,644,316 A * 7/1997 Lewis .................. G01S 7/4008
342/174
7,382,983 B2 * 6/2008 Mizuma .............. H01Q 3/2676
342/368
(Continued)

FOREIGN PATENT DOCUMENTS

WO  WO 03 043195      5/2003
WO  WO 2014 018927    1/2014
WO  WO 2014018927 A1 * 1/2014 ......... H04B 10/2575

OTHER PUBLICATIONS

Analysis and Engineering of Chromatic Dispersion in Silicon Waveguide Bends and Ring Resonators by Lin Zhang et al.; Optical Society of America—2011.
(Continued)

*Primary Examiner* — Dalzid Singh
(74) *Attorney, Agent, or Firm* — Baker Botts, LLP

(57) ABSTRACT

A feed signal generator (10) for a phased array antenna, comprising: an input (12) to receive an optical spectrum having first and second phase-locked spectral components, respectively having first and second optical frequencies; wavelength selective separator apparatus (14) to separate the optical spectrum into a first optical signal being the first spectral component and a second optical signal being the second spectral component; an optical time delay element (16) to apply a time delay to the first optical signal to form a delayed optical signal; a heterodyning device (20) to heterodyne the delayed optical signal and the second optical signal to generate a feed signal (22) having a power proportional to a product of the amplitudes of the second and delayed optical signals and a phase proportional to the time delay; and optical amplitude control apparatus (18) to set an amplitude of the delayed optical signal such that the product of said amplitudes causes the power of the feed signal to have a preselected value.

16 Claims, 19 Drawing Sheets

(51) Int. Cl.
*G01S 7/02* (2006.01)
*G01S 13/02* (2006.01)
*H01Q 3/26* (2006.01)
*H01Q 21/22* (2006.01)
*H04L 7/00* (2006.01)

(52) U.S. Cl.
CPC ........... *H01Q 21/22* (2013.01); *H04B 10/506* (2013.01); *H04L 7/0075* (2013.01); *G01S 2013/0254* (2013.01); *H04B 2210/006* (2013.01)

(58) Field of Classification Search
USPC ......................................................... 398/192
See application file for complete search history.

(56) References Cited

U.S. PATENT DOCUMENTS

| 7,877,020 | B1* | 1/2011 | Hayes | H04B 10/50 |
| | | | | 398/183 |
| 9,614,280 | B2* | 4/2017 | Shi | H01Q 3/2676 |
| 2012/0163501 | A1* | 6/2012 | Dong | H04L 27/2096 |
| | | | | 375/300 |

OTHER PUBLICATIONS

Development of a Broadband Integrated Optical Beamformer for Ku-Band Phased Array Antennas; Topic: Mobile user—on the Move antennas (vehicular, train, maritime, aeronautical) General technology and techniques advances (Beamforming techniques) by Chris Roeloffzen et al.—2012.

Flexible True-Time Delay Beamforming in a Photonics-Based RF Broadband Signals Generator by Filippo Scotti et al.; Th2B5—2013.

Single-Chip Ring Resonator-Based 1×8 Optical Beam Forming Network in CMOS-Compatible Waveguide Technology by L. Zhuang et al.; IEEE Photonics Technology Letters, vol. 19, No. 15—Aug. 1, 2007.

True Time-Delay Phased-Array Antenna Feed System Based on Optical Heterodyne Techniques by Ligeng Xu et al.; IEEE Photonics Technology Letters, vol. 8, No. 1—Jan. 1996.

International Search Report for International application No. PCT/EP2014/063994—dated Mar. 16, 2015.

Photonic Technologies for Antenna Beamforming by Moshe Tur et al.; Optical Society of America—2011.

* cited by examiner

FEED SIGNAL GENERATION FOR A PHASED ARRAY ANTENNA

PRIORITY

This nonprovisional application is a U.S. National Stage Filing under 35 U.S.C. § 371 of International Patent Application Serial No. PCT/EP2014/063994, filed Jul. 1, 2014, and entitled "Feed Signal Generation For A Phased Array Antenna."

TECHNICAL FIELD

The invention relates to a feed signal generator for a phased array antenna and to a method of generating a feed signal for a phased array antenna. The invention further relates to a wireless communication network transmitter comprising the feed signal generator and to a radar system comprising the feed signal generator.

BACKGROUND

Phased array antennas are widely used in radar systems and are also being introduced into mobile communications networks using pico and nano cells in order to serve densely populated areas with high speed and high quality of service communications links. Due to their reduced size, pico and nano cells face an increased possibility of interference between adjacent cells; beamforming using phased array antennas is being considered in order to control the directivity of the radio frequency signal beam in order to minimize interference. Phased array antennas are characterized by having a radiation lobe that is assembled from many similar radiating antenna elements, such as slots or dipoles, each of which transmit a radio signal having an individually controlled phase and amplitude. Accurately predictable radiation patterns and beam-pointing directions can thereby be achieved. Radar systems and mobile communication network transmitters using phased array antennas can adopt an optical radio frequency generation and control that enables high signal quality, Q, operations to be performed on a very stable RF signal.

Optical generation of RF signals is based on heterodyning a pair of phase locked optical signals which have an optical frequency difference equal to the desired RF signal frequency. The direction of the resulting beam is controlled by appropriately setting the phase of the RF signal transmitted by each element. The phase is controlled by introducing an appropriate time delay between the optical signals before they are heterodyned. In one approach, a pair of time delayed optical signals are generated by subjecting the optical spectrum generated by a mode-locking laser, MLL, to chromatic dispersion by transmitting it through an optical fibre. Due to their different wavelengths, the various spectral components in the MLL spectrum experience different delays. By selecting a suitable pair of optical components in the spectrum a specific delay can be introduced, giving the resulting RF signal a specific phase. In this approach, the pair of spectral components of the MLL spectrum are selected using a wavelength selective device, like a wavelength selective switch, WSS, which is typically big and very expensive. Since a phased array antenna includes hundreds elements, it easy to see that such an approach becomes prohibitive in terms of cost and space. The use of an optical fibre to introduce the time delay by exploiting the chromatic dispersion profile of the fibre faces limitations on the total delta delay which can be applied and the delay resolution. A longer delta delay can be achieved by increasing the chromatic dispersion, whereas a higher resolution is achieved by reducing it. In another approach, reported in L. Zhuang et al, "Single-Chip Ring Resonator-Based 1×8 Optical Beam Forming Network in CMOS-Compatible Waveguide Technology", IEEE Photonics Technology Letters, vol. 19, August, 2007, pp 1130-1132, time delay is introduced by exploiting micro ring resonator elements instead of optical fibres and WSS devices, to reduce the space occupancy, cost and power consumption. Ring resonators introduce cumulated chromatic dispersion to generate a group delay in the passing through light. However, this solution faces functional limitations due to the filtering response of the ring resonator, centred at the resonance frequency of the micro-rings. To operate with a low optical loss, the operating wavelength needs to be far from the resonance frequency, which unfortunately is in the part of the ring resonator transmission spectrum where the group delay generated by the ring resonator is substantially lower. As a consequence, cascaded ring resonators are used to obtain a higher value of group delay, thus complicating the design and the control of the device.

SUMMARY

It is an object to provide an improved feed signal generator for a phased array antenna. It is a further object to provide an improved method of generating a feed signal for a phased array antenna. It is a further object to provide an improved wireless communication network transmitter. It is a further object to provide an improved radar system.

A first aspect of the invention provides a feed signal generator for a phased array antenna. The feed signal generator comprises an input, wavelength selective separator apparatus, an optical time delay element, optical amplitude control apparatus and a heterodyning device. The input is arranged to receive an optical spectrum having first and second phase-locked spectral components. The first spectral component has a first frequency and the second spectral component has a second frequency different to the first frequency by a preselected frequency difference. The wavelength selective separator apparatus is arranged to separate the optical spectrum into a first optical signal being the first spectral component and a second optical signal being the second spectral component. The optical time delay element is arranged to apply a time delay to the first optical signal to form a delayed optical signal. The optical amplitude control apparatus is arranged to set an amplitude of the delayed optical signal. The heterodyning device is arranged to heterodyne the delayed optical signal and the second optical signal to generate a feed signal for the phased array antenna at the preselected frequency difference. The feed signal has a power proportional to a product of an amplitude of the second optical signal and the amplitude of the delayed optical signal and the feed signal has a phase proportional to said time delay. The optical amplitude control apparatus is arranged to set the amplitude of the delayed optical signal such that the product of the amplitude of the second optical signal and the amplitude of the delayed optical signal causes the power of the feed signal to have a preselected value.

The feed signal power is caused to have a preselected value by ensuring that the product of the amplitude of the second optical signal and the amplitude of the delayed optical signal is maintained at an appropriate value. By applying a time delay to only one of the signals to be heterodyned, the amplitude of the second optical signal may act effectively to compensate for optical loss introduced to the delayed optical signal by the time delay element. The amplitude of the delayed optical signal may be set by the optical amplitude control apparatus so that it may be maintained at a substantially constant value even if the optical loss introduced by the time delay element undergoes a change.

In an embodiment, the feed signal generator further comprises an optical modulator arranged to receive a communications signal carrying communications traffic. The optical modulator is arranged to modulate the second optical signal with the communications signal, such that the second optical signal carries the communications traffic. The feed signal generator may be used to generate a feed signal for a phased array antenna, PAA, which carries communications traffic, to be used within a wireless communications network transmitter.

In an embodiment, the optical modulator is arranged to set an amplitude of the second optical signal. Applying a modulation to the second optical signal may also enable the amplitude of the second optical signal to be varied, which may enable the preselected value of the power of the feed signal to be changed.

In an embodiment, the optical time delay element is one of an optical ring resonator and a chirped Bragg grating in an optical waveguide. By applying a time delay to only one of the signals to be heterodyned, the amplitude of the second optical signal may act effectively to compensate for optical loss introduced to the delayed optical signal by the optical ring resonator or the chirped Bragg grating. This may enable the first optical signal to have a wavelength at or close to the resonance frequency of the optical ring resonator, such that a maximum available time delay is applied during formation of the delayed optical signal. This may substantially increase the time delay which may be applied and improve the minimum beam pointing resolution that can be achieved as compared to the prior art described above. Sufficient delay may be applied using a single optical ring resonator or a single chirped Bragg grating. This is in contrast with the prior art in which cascaded optical ring resonators must be used in order to apply a desired time delay while minimising the amount of loss incurred. The additional losses incurred by the feed signal generator are recovered by means of direct detection of the resulting beating signal generated by heterodyning the delayed optical signal and the second optical signal.

In an embodiment, the feed signal generator comprises a first optical splitter and a second optical splitter, a plurality of the said optical time delay elements, a plurality of the said optical amplitude control apparatus and a plurality of the said heterodyning devices. The first optical splitter is arranged to split the first optical signal into a plurality of first optical signals. The second optical splitter arranged to split the second optical signal into a plurality of second optical signals. Each of the plurality of optical time delay elements is arranged to apply a respective time delay to a respective one of said plurality of first optical signals to form a respective delayed optical signal. Each of the plurality of optical amplitude control apparatus is arranged to set an amplitude of a respective delayed optical signal. Each of the plurality of heterodyning devices is arranged to heterodyne a respective delayed optical signal and a respective one of said plurality of second optical signals to generate a respective feed signal at said preselected frequency difference for a respective one of a plurality of antenna elements of the phased array antenna. Each feed signal has a respective phase proportional to the respective time delay. Each of the plurality of optical amplitude control apparatus is arranged to set the amplitude of the respective delayed optical signal such that the respective power of each feed signal is caused to have the preselected value.

The feed signal generator may generate feed signals for each of a plurality of antenna elements of a phased array antenna. The power of each feed signal may have the same preselected value by ensuring that the product of the amplitude of each second optical signal and the respective delayed optical signal is maintained at an appropriate value. By applying a time delay to only one of the signals of each pair to be heterodyned, the amplitude of each second optical signal may act effectively to compensate for optical loss introduced to the respective delayed optical signal by the respective time delay element. The amplitude of each delayed optical signal may be set by the respective optical amplitude control apparatus so that it may be maintained at a substantially constant value even if the optical loss introduced by the respective time delay element undergoes a change. This may enable the direction of a beam generated by the phased array antenna to be controlled by the feed signals, while maintaining the power of the feed signals at the preselected value, even if the amount of optical loss introduced by each time delay element is different.

In an embodiment, each optical time delay element is a variable optical time delay element, such that the time delay applied by each optical time delay element may be varied. Each optical amplitude control apparatus is variable to set the amplitude of the respective delayed optical signal such that the power of each feed signal is maintained at the preselected value. This may enable the beam steering to be implemented by varying the applied time delay, and thus the phase of the feed signal, without changing the wavelength of the first and second optical signals. The feed signal generator may therefore avoid the need for the large, expensive wavelength selective switches used by the prior art devices described above. The variable optical amplitude control apparatus may equalise the amplitudes of the delayed optical signals, so each delayed optical signal has a preselected amplitude.

In an embodiment, each optical amplitude control apparatus is a variable optical attenuator arranged to apply a variable optical attenuation such that each delayed optical signal has a consistent total attenuation applied to it by the respective optical attenuator and the respective optical time delay element. Use of a variable optical attenuator may minimise the power consumption used by the feed signal generator to control the optical amplitude of the delayed optical signal. The variable optical attenuator may equalise the loss acquired by each delayed optical signal, which may ensure that each feed signal has the same signal power.

In an embodiment, each variable optical attenuator is provided before the respective optical time delay element. The variable optical attenuator may therefore be a linear and passive device, or may be a nonlinear or active device, the optical time delay element having a transfer function which may remove any spectral broadening or noise added to the delayed optical signal by the variable optical attenuator.

In an embodiment, each variable optical attenuator is provided after the respective optical time delay element. A variable optical attenuator can be located after the time delay element if the variable optical attenuator is a linear and passive device.

In an embodiment, the feed signal generator further comprises a time delay controller arranged to receive a time delay signal comprising an indication of a respective time delay to be applied to each first optical signal. The time delay controller is arranged to generate at least one first control signal and at least one second control signal. The at least one first control signal comprises instructions arranged to configure each variable optical time delay element to apply the respective time delay to the respective first optical signal. The at least one second control signal comprises instructions arranged to configure each variable optical attenuator to apply a respective attenuation to the respective first optical signal. The attenuation to be applied to each first optical signal is proportional to the respective time delay to be applied by the respective variable optical time delay element. Each variable optical time delay element applies a respective attenuation to the first optical signal while applying the respective time delay. The amount of attenuation which is applied varies with the time delay being applied. The time delay controller ensures that the variable optical attenuator applies an appropriate attenuation to ensure that a consistent total attenuation is applied to it by the respective optical attenuator and the respective optical time delay element.

In an embodiment, each optical amplitude control apparatus is an optical amplifier and is provided before the respective optical time delay element. Use of an optical amplifier may enable the delayed optical signal to have a higher amplitude, which may enable the feed signal to have a higher power. Locating the amplifier before optical time delay element may enable any spectral broadening introduced by the amplifier to be substantially removed by the optical time delay element's transfer function. Locating the amplifier before optical time delay element may also enable a non-flat gain profile of the amplifier to be substantially equalised by the optical time delay element's transfer function.

In an embodiment, each heterodyning device comprises an optical coupler and a photodiode. The optical coupler is arranged to combine the respective delayed optical signal and the respective second optical signal prior to detection in the photodiode.

In an embodiment, the wavelength selective separator apparatus is an optical demultiplexer. In an embodiment, the wavelength selective separator apparatus is an arrayed waveguide grating.

In an embodiment, the feed signal generator further comprises a chirped Bragg grating in an optical waveguide. The chirped Bragg grating is arranged to apply a wavelength dependent time delay to the second optical signal output from the optical modulator. This may reduce beam squint in a phased array antenna driven by the feed signals.

In an embodiment, the feed signal that is generated is a radio frequency signal.

In an embodiment, the feed signal generator further comprises a trans-impedance amplifier arranged to amplify the radio frequency feed signal.

In an embodiment, each optical time delay element, optical amplitude control apparatus and heterodyning device are provided as a photonic integrated circuit.

In an embodiment, the feed signal generator is provided as a photonic integrated circuit. An effective, cheap feed signal generator having a small footprint may therefore be provided to generate feed signals for phased array antennas. This may be of particular use in radar systems and in mobile telecommunications networks operating pico and nano cells.

In an embodiment, the chirped Bragg grating is provided in a planar optical waveguide.

A second aspect of the invention provides a wireless communication network transmitter comprising a phased array antenna, an optical source and a feed signal generator for the phased array antenna. The optical source is arranged to provide an optical spectrum having first and second phase-locked spectral components. The first spectral component has a first frequency and the second spectral component has a second frequency different to the first frequency by a preselected frequency difference. The feed signal generator comprises an input, wavelength selective separator apparatus, an optical time delay element, optical amplitude control apparatus and a heterodyning device. The input is arranged to receive the optical spectrum from the optical source. The wavelength selective separator apparatus is arranged to separate the optical spectrum into a first optical signal being the first spectral component and a second optical signal being the second spectral component. The optical time delay element is arranged to apply a time delay to the first optical signal to form a delayed optical signal. The optical amplitude control apparatus is arranged to set an amplitude of the delayed optical signal. The heterodyning device is arranged to heterodyne the delayed optical signal and the second optical signal to generate a feed signal for the phased array antenna at the preselected frequency difference. The feed signal has a power proportional to a product of an amplitude of the second optical signal and the amplitude of the delayed optical signal and the feed signal has a phase proportional to said time delay. The optical amplitude control apparatus is arranged to set the amplitude of the delayed optical signal such that the product of the amplitude of the second optical signal and the amplitude of the delayed optical signal causes the power of the feed signal to have a preselected value.

The feed signal power is caused to have a preselected value by ensuring that the product of the amplitude of the second optical signal and the amplitude of the delayed optical signal is maintained at an appropriate value. By applying a time delay to only one of the signals to be heterodyned, the amplitude of the second optical signal may act effectively to compensate for optical loss introduced to the delayed optical signal by the time delay element. The amplitude of the delayed optical signal may be set by the optical amplitude control apparatus so that it may be maintained at a substantially constant value even if the optical loss introduced by the time delay element undergoes a change. This may ensure that the beam transmitted by the phased array antenna is maintained at a preselected power.

In an embodiment, the optical source comprises a laser arranged to generate a carrier optical signal and a Mach-Zehnder modulator arranged to modulate the carrier optical signal to generated first and second side bands being the first and second phase-locked spectral components. The Mach-Zehnder modulator has a transfer function arranged to suppress onward transmission of the carrier optical signal. This may provide a low cost optical source.

In an embodiment, the optical source comprises one of a dual-wavelength mode-locked laser and a multi-wavelength mode-locked laser combined with an optical filter having a transfer function arranged to select the first and second phase-locked spectral components.

In an embodiment, the feed signal generator further comprises an optical modulator arranged to receive a communications signal carrying communications traffic. The optical modulator is arranged to modulate the second optical signal with the communications signal, such that the second optical signal carries the communications traffic. The feed signal generator may be used to generate a feed signal carrying communications traffic.

In an embodiment, the optical modulator is arranged to set an amplitude of the second optical signal. Applying a modulation to the second optical signal may also enable the amplitude of the second optical signal to be varied, which may enable the preselected value of the power of the feed signal to be changed.

In an embodiment, the optical time delay element is one of an optical ring resonator and a chirped Bragg grating in an optical waveguide. By applying a time delay to only one of the signals to be heterodyned, the amplitude of the second optical signal may act effectively to compensate for optical loss introduced to the delayed optical signal by the optical ring resonator or the chirped Bragg grating. This may enable the first optical signal to have a wavelength at or close to the resonance frequency of the optical ring resonator, such that a maximum available time delay is applied during formation of the delayed optical signal. This may substantially increase the time delay which may be applied and improve the minimum beam pointing resolution that can be achieved as compared to the prior art described above. Sufficient delay may be applied using a single optical ring resonator or a single chirped Bragg grating. This is in contrast with the prior art in which cascaded optical ring resonators must be used in order to apply a desired time delay while minimising the amount of loss incurred. The additional losses incurred by the feed signal generator are recovered by means of direct detection of the resulting beating signal generated by heterodyning the delayed optical signal and the second optical signal.

In an embodiment, the feed signal generator comprises a first optical splitter and a second optical splitter, a plurality of the said optical time delay elements, a plurality of the said optical amplitude control apparatus and a plurality of the said heterodyning devices. The first optical splitter is arranged to split the first optical signal into a plurality of first optical signals. The second optical splitter arranged to split the second optical signal into a plurality of second optical signals. Each of the plurality of optical time delay elements is arranged to apply a respective time delay to a respective one of said plurality of first optical signals to form a respective delayed optical signal. Each of the plurality of optical amplitude control apparatus is arranged to set an amplitude of a respective delayed optical signal. Each of the plurality of heterodyning devices is arranged to heterodyne a respective delayed optical signal and a respective one of said plurality of second optical signals to generate a respective feed signal at said preselected frequency difference for a respective one of a plurality of antenna elements of the phased array antenna. Each feed signal has a respective phase proportional to the respective time delay. Each of the plurality of optical amplitude control apparatus is arranged to set the amplitude of the respective delayed optical signal such that the respective power of each feed signal is caused to have the preselected value.

The feed signal generator may generate feed signals for each of a plurality of antenna elements of the phased array antenna. The power of each feed signal may have the same preselected value by ensuring that the product of the amplitude of each second optical signal and the respective delayed optical signal is maintained at an appropriate value. By applying a time delay to only one of the signals of each pair to be heterodyned, the amplitude of each second optical signal may act effectively to compensate for optical loss introduced to the respective delayed optical signal by the respective time delay element. The amplitude of each delayed optical signal may be set by the respective optical amplitude control apparatus so that it may be maintained at a substantially constant value even if the optical loss introduced by the respective time delay element undergoes a change. This may enable the direction of a beam generated by the phased array antenna to be controlled by the feed signals, while maintaining the power of the feed signals at the preselected value, even if the amount of optical loss introduced by each time delay element is different.

In an embodiment, each optical time delay element is a variable optical time delay element, such that the time delay applied by each optical time delay element may be varied. Each optical amplitude control apparatus is variable to set the amplitude of the respective delayed optical signal such that the power of each feed signal is maintained at the preselected value. This may enable the beam steering to be implemented by varying the applied time delay, and thus the phase of the feed signal, without changing the wavelength of the first and second optical signals. The feed signal generator may therefore avoid the need for the large, expensive wavelength selective switches used by the prior art devices described above. The variable optical amplitude control apparatus may equalise the amplitudes of the delayed optical signals, so each delayed optical signal has a preselected amplitude.

In an embodiment, each optical amplitude control apparatus is a variable optical attenuator arranged to apply a variable optical attenuation such that each delayed optical signal has a consistent total attenuation applied to it by the respective optical attenuator and the respective optical time delay element. Use of a variable optical attenuator may minimise the power consumption used by the feed signal generator to control the optical amplitude of the delayed optical signal. The variable optical attenuator may equalise the loss acquired by each delayed optical signal, which may ensure that each feed signal has the same signal power.

In an embodiment, each variable optical attenuator is provided before the respective optical time delay element. The variable optical attenuator may therefore be a linear and passive device, or may be a nonlinear or active device, the optical time delay element having a transfer function which may remove any spectral broadening or noise added to the delayed optical signal by the variable optical attenuator.

In an embodiment, each variable optical attenuator is provided after the respective optical time delay element. A variable optical attenuator can be located after the time delay element if the variable optical attenuator is a linear and passive device.

In an embodiment, the feed signal generator further comprises a time delay controller arranged to receive a time delay signal comprising an indication of a respective time delay to be applied to each first optical signal. The time delay controller is arranged to generate at least one first control signal and at least one second control signal. The at least one first control signal comprises instructions arranged to configure each variable optical time delay element to apply the respective time delay to the respective first optical signal. The at least one second control signal comprises instructions arranged to configure each variable optical attenuator to apply a respective attenuation to the respective first optical signal. The attenuation to be applied to each first optical signal is proportional to the respective time delay to be applied by the respective variable optical time delay element. Each variable optical time delay element applies a respective attenuation to the first optical signal while applying the respective time delay. The amount of attenuation which is applied varies with the time delay being applied. The time delay controller ensures that the variable optical attenuator applies an appropriate attenuation to ensure that a consistent total attenuation is applied to it by the respective optical attenuator and the respective optical time delay element.

In an embodiment, each optical amplitude control apparatus is an optical amplifier and is provided before the respective optical time delay element. Use of an optical amplifier may enable the delayed optical signal to have a higher amplitude, which may enable the feed signal to have a higher power. Locating the amplifier before optical time delay element may enable any spectral broadening introduced by the amplifier to be substantially removed by the optical time delay element's transfer function. Locating the amplifier before optical time delay element may also enable a non-flat gain profile of the amplifier to be substantially equalised by the optical time delay element's transfer function.

In an embodiment, each heterodyning device comprises an optical coupler and a photodiode. The optical coupler is arranged to combine the respective delayed optical signal and the respective second optical signal prior to detection in the photodiode.

In an embodiment, the wavelength selective separator apparatus is an optical demultiplexer. In an embodiment, the wavelength selective separator apparatus is an arrayed waveguide grating.

In an embodiment, the feed signal generator further comprises a chirped Bragg grating in an optical waveguide. The chirped Bragg grating is arranged to apply a wavelength dependent time delay to the second optical signal output from the optical modulator. This may reduce beam squint in a phased array antenna driven by the feed signals.

In an embodiment, the feed signal that is generated is a radio frequency signal.

In an embodiment, the feed signal generator further comprises a trans-impedance amplifier arranged to amplify the radio frequency feed signal.

In an embodiment, each optical time delay element, optical amplitude control apparatus and heterodyning device are provided as a photonic integrated circuit.

In an embodiment, the feed signal generator and the optical source are provided as a photonic integrated circuit. An effective, cheap device having a small footprint may therefore be provided to generate feed signals for the phased array antenna. This may be of particular importance in mobile telecommunications networks operating pico and nano cells.

In an embodiment, the chirped Bragg grating is provided in a planar optical waveguide.

A third aspect of the invention provides a radar system comprising a phased array antenna, an optical source and a feed signal generator for the phased array antenna. The optical source is arranged to provide an optical spectrum having first and second phase-locked spectral components. The first spectral component has a first frequency and the second spectral component has a second frequency different to the first frequency by a preselected frequency difference. The feed signal generator comprises an input, wavelength selective separator apparatus, an optical time delay element, optical amplitude control apparatus and a heterodyning device. The input is arranged to receive the optical spectrum from the optical source. The wavelength selective separator apparatus is arranged to separate the optical spectrum into a first optical signal being the first spectral component and a second optical signal being the second spectral component. The optical time delay element is arranged to apply a time delay to the first optical signal to form a delayed optical signal. The optical amplitude control apparatus is arranged to set an amplitude of the delayed optical signal. The heterodyning device is arranged to heterodyne the delayed optical signal and the second optical signal to generate a feed signal for the phased array antenna at the preselected frequency difference. The feed signal has a power proportional to a product of an amplitude of the second optical signal and the amplitude of the delayed optical signal and the feed signal has a phase proportional to said time delay. The optical amplitude control apparatus is arranged to set the amplitude of the delayed optical signal such that the product of the amplitude of the second optical signal and the amplitude of the delayed optical signal causes the power of the feed signal to have a preselected value.

The feed signal power is caused to have a preselected value by ensuring that the product of the amplitude of the second optical signal and the amplitude of the delayed optical signal is maintained at an appropriate value. By applying a time delay to only one of the signals to be heterodyned, the amplitude of the second optical signal may act effectively to compensate for optical loss introduced to the delayed optical signal by the time delay element. The amplitude of the delayed optical signal may be set by the optical amplitude control apparatus so that it may be maintained at a substantially constant value even if the optical loss introduced by the time delay element undergoes a change. This may ensure that the beam transmitted by the phased array antenna is maintained at a preselected power.

In an embodiment, the optical source comprises a laser arranged to generate a carrier optical signal and a Mach-Zehnder modulator arranged to modulate the carrier optical signal to generated first and second side bands being the first and second phase-locked spectral components. The Mach-Zehnder modulator has a transfer function arranged to suppress onward transmission of the carrier optical signal. This may provide a low cost optical source.

In an embodiment, the optical source comprises one of a dual-wavelength mode-locked laser and a multi-wavelength mode-locked laser combined with an optical filter having a transfer function arranged to select the first and second phase-locked spectral components.

In an embodiment, the optical time delay element is one of an optical ring resonator and a chirped Bragg grating in an optical waveguide. By applying a time delay to only one of the signals to be heterodyned, the amplitude of the second optical signal may act effectively to compensate for optical loss introduced to the delayed optical signal by the optical ring resonator or the chirped Bragg grating. This may enable the first optical signal to have a wavelength at or close to the resonance frequency of the optical ring resonator, such that a maximum available time delay is applied during formation of the delayed optical signal. This may substantially increase the time delay which may be applied and improve the minimum beam pointing resolution that can be achieved as compared to the prior art described above. Sufficient delay may be applied using a single optical ring resonator or a single chirped Bragg grating. This is in contrast with the prior art in which cascaded optical ring resonators must be used in order to apply a desired time delay while minimising the amount of loss incurred. The additional losses incurred by the feed signal generator are recovered by means of direct detection of the resulting beating signal generated by heterodyning the delayed optical signal and the second optical signal.

In an embodiment, the feed signal generator comprises a first optical splitter and a second optical splitter, a plurality of the said optical time delay elements, a plurality of the said optical amplitude control apparatus and a plurality of the said heterodyning devices. The first optical splitter is arranged to split the first optical signal into a plurality of first optical signals. The second optical splitter arranged to split the second optical signal into a plurality of second optical signals. Each of the plurality of optical time delay elements is arranged to apply a respective time delay to a respective one of said plurality of first optical signals to form a respective delayed optical signal. Each of the plurality of optical amplitude control apparatus is arranged to set an amplitude of a respective delayed optical signal. Each of the plurality of heterodyning devices is arranged to heterodyne a respective delayed optical signal and a respective one of said plurality of second optical signals to generate a respective feed signal at said preselected frequency difference for a respective one of a plurality of antenna elements of the phased array antenna. Each feed signal has a respective phase proportional to the respective time delay. Each of the plurality of optical amplitude control apparatus is arranged to set the amplitude of the respective delayed optical signal such that the respective power of each feed signal is caused to have the preselected value.

The feed signal generator may generate feed signals for each of a plurality of antenna elements of the phased array antenna. The power of each feed signal may have the same preselected value by ensuring that the product of the amplitude of each second optical signal and the respective delayed optical signal is maintained at an appropriate value. By applying a time delay to only one of the signals of each pair to be heterodyned, the amplitude of each second optical signal may act effectively to compensate for optical loss introduced to the respective delayed optical signal by the respective time delay element. The amplitude of each delayed optical signal may be set by the respective optical amplitude control apparatus so that it may be maintained at a substantially constant value even if the optical loss introduced by the respective time delay element undergoes a change. This may enable the direction of a beam generated by the phased array antenna to be controlled by the feed signals, while maintaining the power of the feed signals at the preselected value, even if the amount of optical loss introduced by each time delay element is different.

In an embodiment, each optical time delay element is a variable optical time delay element, such that the time delay applied by each optical time delay element may be varied. Each optical amplitude control apparatus is variable to set the amplitude of the respective delayed optical signal such that the power of each feed signal is maintained at the preselected value. This may enable the beam steering to be implemented by varying the applied time delay, and thus the phase of the feed signal, without changing the wavelength of the first and second optical signals. The feed signal generator may therefore avoid the need for the large, expensive wavelength selective switches used by the prior art devices described above. The variable optical amplitude control apparatus may equalise the amplitudes of the delayed optical signals, so each delayed optical signal has a preselected amplitude.

In an embodiment, each optical amplitude control apparatus is a variable optical attenuator arranged to apply a variable optical attenuation such that each delayed optical signal has a consistent total attenuation applied to it by the respective optical attenuator and the respective optical time delay element. Use of a variable optical attenuator may minimise the power consumption used by the feed signal generator to control the optical amplitude of the delayed optical signal. The variable optical attenuator may equalise the loss acquired by each delayed optical signal, which may ensure that each feed signal has the same signal power.

In an embodiment, each variable optical attenuator is provided before the respective optical time delay element. The variable optical attenuator may therefore be a linear and passive device, or may be a nonlinear or active device, the optical time delay element having a transfer function which may remove any spectral broadening or noise added to the delayed optical signal by the variable optical attenuator.

In an embodiment, each variable optical attenuator is provided after the respective optical time delay element. A variable optical attenuator can be located after the time delay element if the variable optical attenuator is a linear and passive device.

In an embodiment, the feed signal generator further comprises a time delay controller arranged to receive a time delay signal comprising an indication of a respective time delay to be applied to each first optical signal. The time delay controller is arranged to generate at least one first control signal and at least one second control signal. The at least one first control signal comprises instructions arranged to configure each variable optical time delay element to apply the respective time delay to the respective first optical signal. The at least one second control signal comprises instructions arranged to configure each variable optical attenuator to apply a respective attenuation to the respective first optical signal. The attenuation to be applied to each first optical signal is proportional to the respective time delay to be applied by the respective variable optical time delay element. Each variable optical time delay element applies a respective attenuation to the first optical signal while applying the respective time delay. The amount of attenuation which is applied varies with the time delay being applied. The time delay controller ensures that the variable optical attenuator applies an appropriate attenuation to ensure that a consistent total attenuation is applied to it by the respective optical attenuator and the respective optical time delay element.

In an embodiment, each optical amplitude control apparatus is an optical amplifier and is provided before the respective optical time delay element. Use of an optical amplifier may enable the delayed optical signal to have a higher amplitude, which may enable the feed signal to have a higher power. Locating the amplifier before optical time delay element may enable any spectral broadening introduced by the amplifier to be substantially removed by the optical time delay element's transfer function. Locating the amplifier before optical time delay element may also enable a non-flat gain profile of the amplifier to be substantially equalised by the optical time delay element's transfer function.

In an embodiment, each heterodyning device comprises an optical coupler and a photodiode. The optical coupler is arranged to combine the respective delayed optical signal and the respective second optical signal prior to detection in the photodiode.

In an embodiment, the wavelength selective separator apparatus is an optical demultiplexer. In an embodiment, the wavelength selective separator apparatus is an arrayed waveguide grating.

In an embodiment, the feed signal generator further comprises a chirped Bragg grating in an optical waveguide. The chirped Bragg grating is arranged to apply a wavelength dependent time delay to the second optical signal output from the optical modulator. This may reduce beam squint in a phased array antenna driven by the feed signals.

In an embodiment, the feed signal that is generated is a radio frequency signal.

In an embodiment, the feed signal generator further comprises a trans-impedance amplifier arranged to amplify the radio frequency feed signal.

In an embodiment, each optical time delay element, optical amplitude control apparatus and heterodyning device are provided as a photonic integrated circuit.

In an embodiment, the feed signal generator and the optical source are provided as a photonic integrated circuit. An effective, cheap device having a small footprint may therefore be provided to generate feed signals for the phased array antenna.

In an embodiment, the chirped Bragg grating is provided in a planar optical waveguide.

A fourth aspect of the invention provides a method of generating a feed signal for a phased array antenna. The method comprises steps a. to e. In step a., an optical spectrum is provided which has first and second phase-locked spectral components. The first spectral component has a first frequency and the second spectral component has a second frequency different to the first frequency by a preselected frequency difference. In step b., the optical spectrum is separated into a first optical signal being the first spectral component and a second optical signal being the second spectral component. In step c., a time delay is applied to the first optical signal to form a delayed optical signal. In step d., an amplitude of the delayed optical signal is set. In step e., the delayed optical signal and the second optical signal are heterodyned to generate a feed signal for the phased array antenna at the preselected frequency difference. The feed signal has a power proportional to a product of an amplitude of the second optical signal and the amplitude of the delayed optical signal and has a phase proportional to said time delay. The amplitude of the delayed optical signal is set such that the product of the amplitude of the second optical signal and the amplitude of the delayed optical signal causes the power of the feed signal to have a preselected value.

The feed signal power is caused to have a preselected value by ensuring that the product of the amplitude of the second optical signal and the amplitude of the delayed optical signal is maintained at an appropriate value. By applying a time delay to only one of the signals to be heterodyned, the amplitude of the second optical signal may act effectively to compensate for optical loss introduced to the delayed optical signal during application of the time delay. The amplitude of the delayed optical signal may be maintained at a substantially constant value even if the optical loss introduced to the delayed optical signal undergoes a change.

In an embodiment, the method further comprises, before step e., receiving a communications signal carrying communications traffic and modulating the second optical signal with the communications signal, such that the second optical signal carries the communications traffic. A feed signal may be generated for a phased array antenna, PAA, which carries communications traffic, to be used within a wireless communications network transmitter.

In an embodiment, the modulation is arranged to set an amplitude of the second optical signal. Applying a modulation to the second optical signal may also enable the amplitude of the second optical signal to be varied, which may enable the preselected value of the power of the feed signal to be changed.

In an embodiment, in step c. the time delay is applied to the first optical signal using one of an optical ring resonator and a chirped Bragg grating in an optical waveguide. By applying a time delay to only one of the signals to be heterodyned, the amplitude of the second optical signal may act effectively to compensate for optical loss introduced to the delayed optical signal by the optical ring resonator or the chirped Bragg grating. This may enable the first optical signal to have a wavelength at or close to the resonance frequency of the optical ring resonator, such that a maximum available time delay is applied during formation of the delayed optical signal. This may substantially increase the time delay which may be applied and improve the minimum beam pointing resolution that can be achieved as compared to the prior art described above. Sufficient delay may be applied using a single optical ring resonator or a single chirped Bragg grating. This is in contrast with the prior art in which a desired time delay is applied in a plurality of steps, using cascaded optical ring, in order to minimise the amount of loss introduced. The additional losses introduced by using an optical ring resonator or a chirped Bragg grating are recovered by means of direct detection of the resulting beating signal generated by heterodyning the delayed optical signal and the second optical signal.

In an embodiment, after step b., the first optical signal is split into a plurality of first optical signals and the second optical signal is split into a plurality of second optical signals. In step c., a respective time delay is applied to each of the plurality of first optical signals to form a respective delayed optical signal. In step d. a respective amplitude of each delayed optical signal is set. In step e., each delayed optical signal is heterodyned with a respective one of the plurality of second optical signals to generate a respective feed signal at the preselected frequency difference for a respective one of a plurality of antenna elements of the phased array antenna. Each feed signal has a respective phase proportional to the respective time delay. In step d., the respective amplitude of each delayed optical signal is set such that the respective power of each feed signal is caused to have the preselected value.

Feed signals may therefore be generated for each of a plurality of antenna elements of a phased array antenna. The power of each feed signal may have the same preselected value by ensuring that the product of the amplitude of each second optical signal and the respective delayed optical signal is maintained at an appropriate value. By applying a time delay to only one of the signals of each pair to be heterodyned, the amplitude of each second optical signal may act effectively to compensate for optical loss introduced to the respective delayed optical signal. The amplitude of each delayed optical signal may be set so that it may be maintained at a substantially constant value even if the optical loss introduced during formation undergoes a change. This may enable the direction of a beam generated by the phased array antenna to be controlled by the feed signals, while maintaining the power of the feed signals at the preselected value, even if the amount of optical loss introduced during formation of each delayed optical signal is different.

In an embodiment, in step d. the time delay applied during formation of each delayed optical signal may be varied. The amplitude of each delayed optical signal may be set such that the power of each feed signal is maintained at the preselected value. This may enable the beam steering to be implemented by varying the applied time delay, and thus the phase of the feed signal, without changing the wavelength of the first and second optical signals. Feed signals may therefore be generated without the need for the large, expensive wavelength selective switches used by the prior art devices described above. The amplitude of each delayed optical signal may be varied to equalise the amplitudes of the delayed optical signals, so each delayed optical signal has a preselected amplitude.

In an embodiment, in step d. the amplitude of each delayed optical signal is set by applying a respective attenuation. The attenuation is variable and is set such that the total attenuation acquired by each delayed optical signal is consistent. Application of a variable optical attenuation may equalise the loss acquired by each delayed optical signal, which may ensure that each feed signal has the same signal power.

In an embodiment, the attenuation is applied before the respective optical time delay is applied. Applying the attenuation before the optical time delay may enable any spectral broadening introduced by the attenuation to be substantially removed during formation of the delayed optical signal.

In an embodiment, the attenuation is applied after the respective optical time delay is applied.

In an embodiment, in step d. the amplitude of each delayed optical signal is set by applying a respective amplification to the first optical signal before applying the optical time delay to form the delayed optical signal. Amplifying the first optical signal may enable the delayed optical signal to have a higher amplitude, which may enable the feed signal to have a higher power. Amplifying before applying the optical time delay may enable any spectral broadening introduced during amplification to be substantially removed during formation of the delayed optical signal. Amplifying before applying the optical time delay may enable may also enable a non-flat gain profile to be substantially equalised during formation of the delayed optical signal.

In an embodiment, the method further comprises, after modulating the second optical signal with the communications signal, applying a wavelength dependent time delay to the second optical signal. This may reduce beam squint in a phased array antenna driven by the feed signals.

A fourth aspect of the invention provides a data carrier having computer readable instructions embodied therein. The said computer readable instructions are for providing access to resources available on a processor. The computer readable instructions comprise instructions to cause the processor to perform any of the above steps of the method of generating a feed signal for a phased array antenna.

In an embodiment, the data carrier is a non-transitory data carrier.

Embodiments of the invention will now be described, by way of example only, with reference to the accompanying drawings.

DETAILED DESCRIPTION

Figure 1:
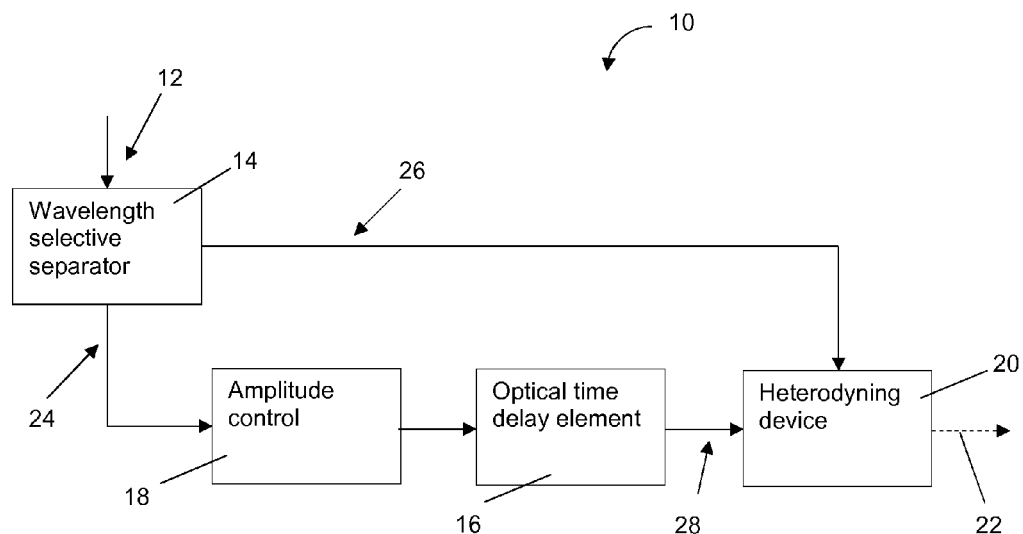
FIG. 1 is a schematic representation of a feed signal generator for a phased array antenna according to a first embodiment of the invention.

Referring to FIG. 1, a first embodiment of the invention provides a feed signal generator 10 for a phased array antenna. The feed signal generator comprises an input 12, wavelength selective separator apparatus 14, an optical time delay element 16, optical amplitude control apparatus 18 and a heterodyning device 20.

The input 12 is arranged to receive an optical spectrum having first and second phase-locked spectral components. Phase-locked spectral components have the same phase at any given point in time; their phases may vary but they will vary synchronously. The first spectral component has a first frequency and the second spectral component has a second frequency different to the first frequency by a preselected frequency difference. The wavelength selective separator apparatus 14 is arranged to separate the optical spectrum into a first optical signal 24 being the first spectral component and a second optical signal 26 being the second spectral component. The optical time delay element 16 is arranged to apply a time delay to the first optical signal 24 to form a delayed optical signal 28.

The optical amplitude control apparatus 18 is arranged to set an amplitude of the delayed optical signal. In this arrangement, the optical amplitude control apparatus is provided before the optical time delay element 16 and is arranged to set the amplitude of the delayed optical signal by setting the amplitude of the first optical signal 24.

The heterodyning device 20 is arranged to heterodyne the delayed optical signal 28 and the second optical signal 26 to generate a feed signal 22 for an antenna element of the phased array antenna. The feed signal has a frequency equal to the preselected frequency difference, a power proportional to a product of an amplitude of the second optical signal and the amplitude of the delayed optical signal and has a phase proportional to the time delay applied by the time delay element during formation of the delayed optical signal.

The optical amplitude control apparatus 18 is arranged to set the amplitude of the delayed optical signal such that the product of its amplitude and the amplitude of the second optical signal causes the feed signal to have a power having a preselected value.

Figure 2:
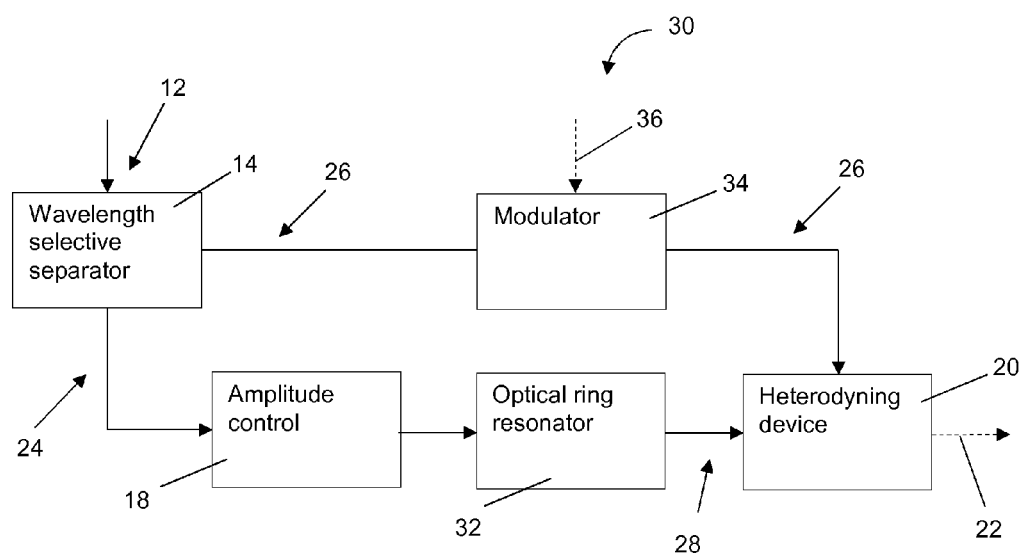
FIG. 2 is a schematic representation of a feed signal generator for a phased array antenna according to a second embodiment of the invention.

FIG. 2 shows a feed signal generator 30 according to a second embodiment of the invention, which is similar to the feed signal generator 10 of the first embodiment, with the following modifications. The same reference numbers are retained for corresponding features.

The feed signal generator 30 of this embodiment additionally comprises an optical modulator 34. The optical modulator is arranged to receive a communications signal 36 carrying communications traffic. The optical modulator is arranged to modulate the second optical signal 26 with the communications signal 36, such that the second optical signal carries the communications traffic and therefore the resulting feed signal 22 carries the communications traffic.

The optical time delay element in this embodiment is an optical ring resonator 32.

Figure 3:
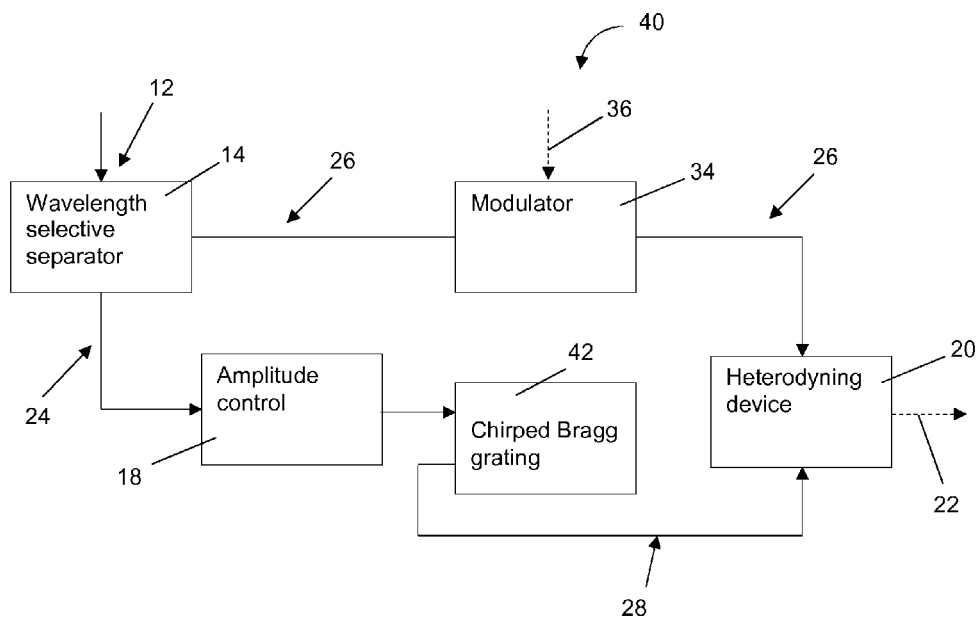
FIG. 3 is a schematic representation of a feed signal generator for a phased array antenna according to a third embodiment of the invention.

FIG. 3 shows a feed signal generator 40 according to a third embodiment of the invention, which is similar to the feed signal generator 20 of the second embodiment, with the following modifications. The same reference numbers are retained for corresponding features.

The optical time delay element in this embodiment is a chirped Bragg grating 42 provided in a planar optical waveguide. In contrast to the optical ring resonator 32 of the previous embodiment, the chirped Bragg grating operates in reflection.

A chirped fibre Bragg grating may alternatively be used.

Figure 4:
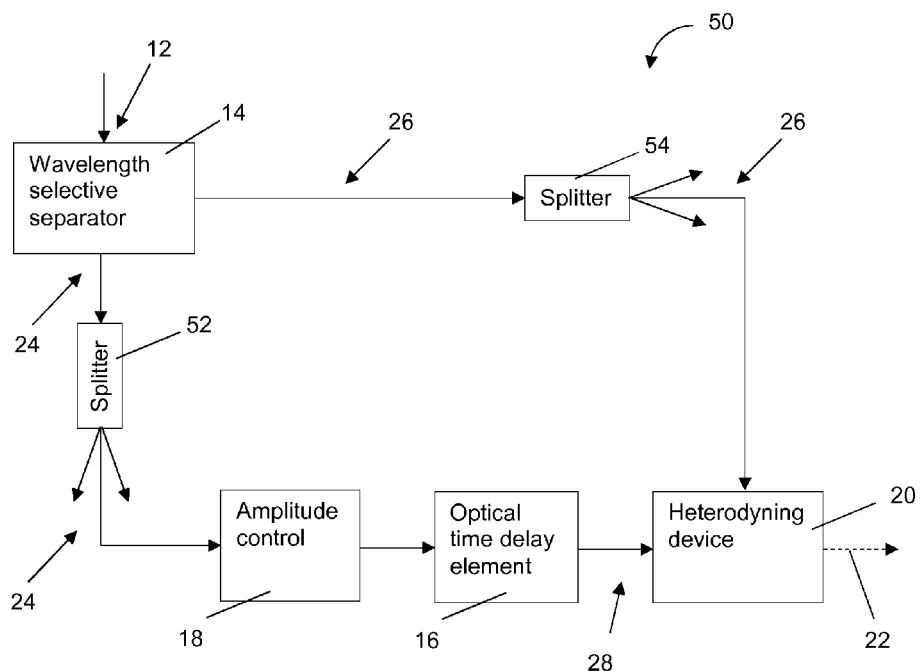
FIG. 4 is a schematic representation of a feed signal generator for a phased array antenna according to a fourth embodiment of the invention.

Referring to FIG. 4, a fourth embodiment of the invention provides a feed signal generator 50 which is similar to the feed signal generator 10 of the first embodiment, with the following modifications. The same reference numbers are retained for corresponding features.

The feed signal generator 50 of this embodiment additionally comprises a first optical splitter 52, arranged to split the first optical signal 24 into a plurality of first optical signals 24, and a second optical splitter 54, arranged to split the second optical signal 26 into a plurality of second optical signals 26.

In this embodiment, there are a plurality of the optical time delay elements 16, a plurality of the optical amplitude control apparatus 18 and a plurality of the heterodyning devices 20. Each of the optical time delay elements 16 is arranged to apply a respective time delay to a respective one of the plurality of first optical signals 24 to form a respective delayed optical signal 28. Each of the optical amplitude control apparatus 18 is arranged to set an amplitude of the respective delayed optical signal.

Each of the heterodyning devices 20 is arranged to heterodyne a respective delayed optical signal and a respective one of the plurality second optical signals to generate a respective feed signal 22 for a respective one of a plurality of antenna elements of the phased array antenna. Each feed signal has a respective phase proportional to the time delay applied by the respective optical time delay element 16. Each optical amplitude control apparatus is arranged to set the amplitude of the respective delayed optical signal such that the respective power of each feed signal is caused to have the preselected value.

FIG. 4 shows only one line comprising an optical time delay element, an optical amplitude control apparatus and an heterodyning device for reasons of clarity but it will be understood that a corresponding line is provided to receive a respective first optical signal 24 and a respective second optical signal 26 and to generate a respective feed signal 22 for each antenna element.

Figure 5:
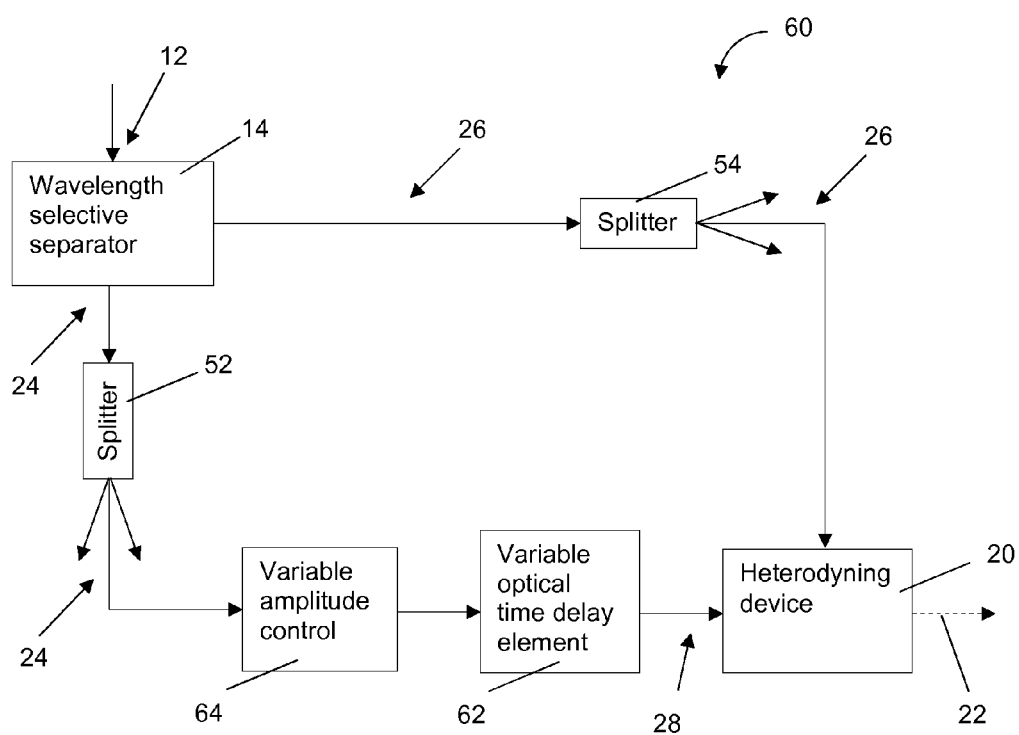
FIG. 5 is a schematic representation of a feed signal generator for a phased array antenna according to a fifth embodiment of the invention.

FIG. 5 shows a feed signal generator 60 according to a fifth embodiment of the invention which is similar to the feed signal generator 50 of the previous embodiment, with the following modifications. The same reference numbers are retained for corresponding features.

In this embodiment, each optical time delay element is a variable optical time delay element 62 and each optical amplitude control apparatus 64 is also variable. The variable optical time delay element allows the time delay which is applied to form the respective delayed optical signal to be changed. The phase of each feed signal 22 can therefore be changed, so that the direction of the beam transmitted by the phased array antenna can be changed. Having a variable optical amplitude control apparatus means that the amplitude of the respective delayed optical signal can be varied, enabling the amplitude of all of the delayed optical signals to be equalised, such that the product of the amplitude of the delayed optical signal and the amplitude of the second optical signal is maintained at an appropriate level to ensure that the power of each feed signal is maintained at the preselected value.

Figure 6:
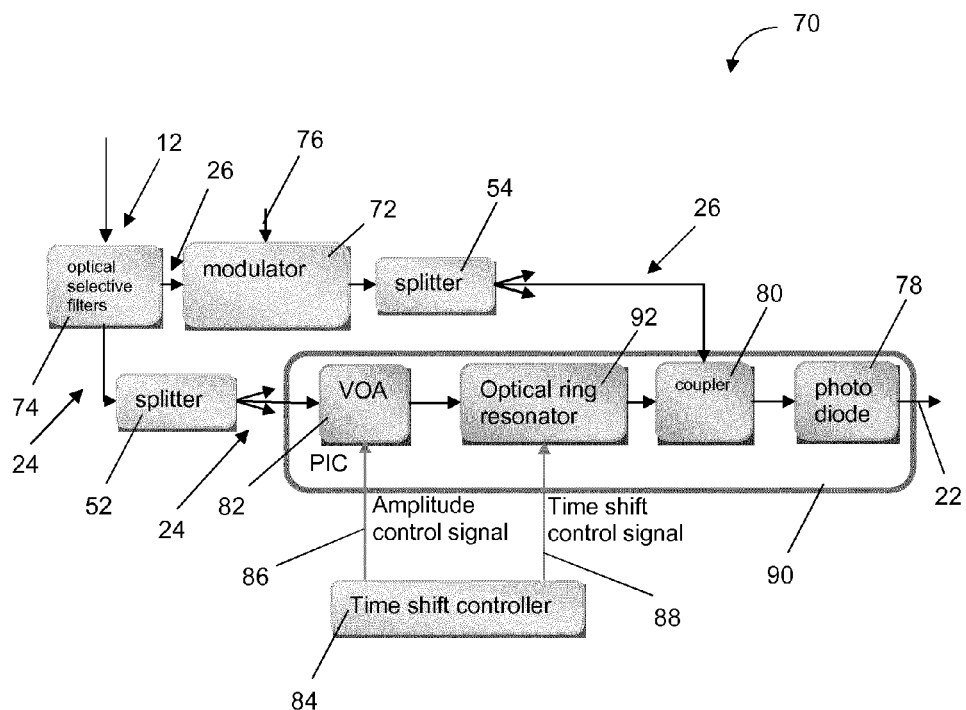
FIG. 6 is a schematic representation of a feed signal generator for a phased array antenna according to a sixth embodiment of the invention.

A sixth embodiment of the invention provides a feed signal generator 70 as shown in FIG. 6. The feed signal generator 70 of this embodiment is similar to the feed signal generator 60 of the previous embodiment, with the following modifications The wavelength selective separator in this embodiment is formed of optical selective filters 74, such as an arrayed waveguide grating, AWG. The feed signal generator 70 additionally comprises an optical modulator 72 arranged to receive a communications signal 76 and arranged to modulate the second optical signal 26 with the communications signal, so the second optical signal carries the communications traffic, The feed signal generator 70 additionally comprises a plurality of optical couplers 80 each arranged to receive and combine the respective delayed optical signal and second optical signal, and output the combined signals to the respective heterodyning device, which here is a photodiode 78. The resulting feed signal 22 also carries the communications traffic.

Each variable optical time delay element is an optical ring resonator 92 and each variable optical amplitude control apparatus is a variable optical attenuator, VOA, 82, provided before the optical ring resonator. A VOA is placed in front of each optical ring resonator to equalize the losses among different lines, so that each delayed optical signal always has the same amplitude.

Each VOA 82, optical ring resonator 92, coupler 80 and photodiode 78 is provided as a photonic integrated circuit, PIC, 90 which may be provided on a chip. If required, a trans-impedance amplifier can also be integrated on the chip with the photodiode to amplify the feed signal to be delivered to the respective PAA element, which may enable an RF PAA to be fed directly from the feed signal generator 70.

Figure 7:
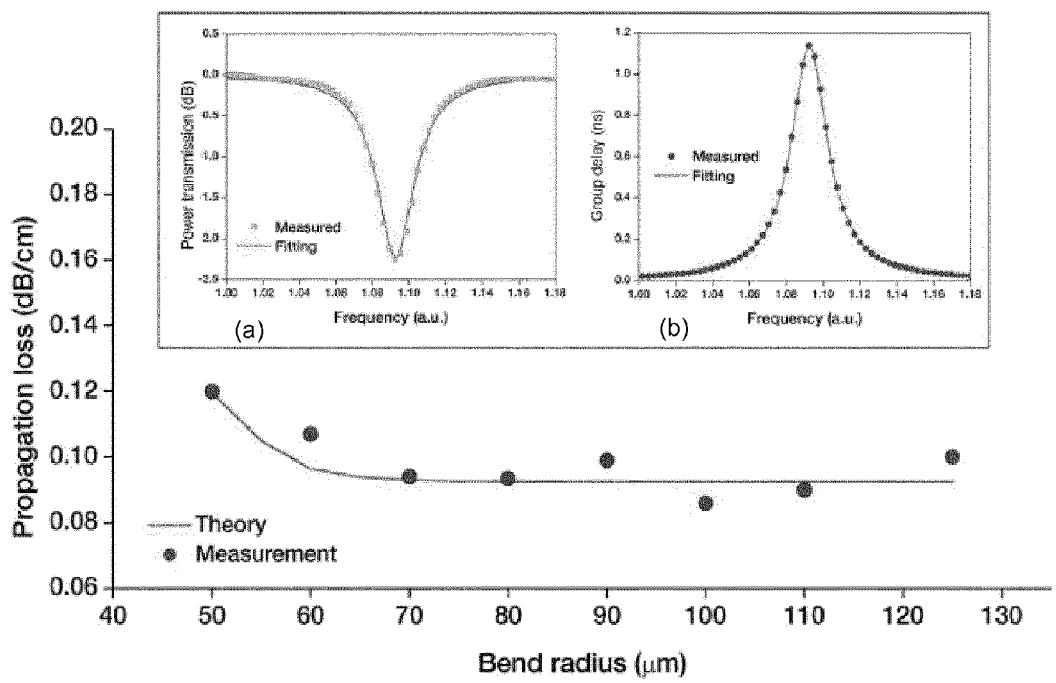
FIG. 7 shows propagation loss (dB/cm) as a function of bend radius (μm) of the optical ring resonator of FIG. 6, inset (a) shows the power transmission (dB) as a function of optical signal frequency of the optical ring resonator and inset (b) shows the group delay (ns) as a function of optical signal frequency of the optical ring resonator.

The chromatic dispersion characteristics of the optical ring resonator are exploited to apply a time delay to the first optical signal 24, to form the delayed optical signal 28. As shown in FIG. 7, inset (b), the group delay applied by the optical ring resonator varies with the optical frequency of the first optical signal. If the optical frequency of the first optical signal coincides with the resonance frequency of the optical ring resonator, approximately 1.09 in this example, the maximum amount of group delay, approximately 1.15 ns, will be applied. If the optical frequency of the first optical signal is to either side of the resonance frequency a lower group delay will be applied. The amount of delay applied to the first optical signal to form the delayed optical signal can be varied by tuning the resonance frequency of the optical ring resonator, to thereby change the position of the optical frequency of the first optical signal on the group delay profile.

A time shift controller 84 (also referred to herein as the time delay controller) is provided which is arranged to receive a time delay signal (not shown) indicating a respective time delay to be applied to each first optical signal. The time shift controller is arranged to generate a time shift control signal 88 and an amplitude control signal 86. The time shift control signal sent to each optical ring resonator 92 is arranged to configure the optical ring resonator to apply the respective time delay to the respective first optical signal.

The chromatic dispersion of the optical ring resonator follows a specific, nonlinear, profile that is a function of the voltage signal driving it. The time shift control signal 88 is therefore a voltage signal generated by the time shift controller 84 as a function of the time delay required. The attenuation of the optical ring resonator changes when moving from one time delay value to another with a precise behaviour. The proposed solution allows a real time handling of time shift, permitting also the tracking of moving targets with narrow radio beams (i.e. narrow radio lobes). This allows the reduction of power emission and of interference with other channels.

The amplitude control signal is arranged to configure the VOA 82 to apply a respective attenuation to the respective first optical signal 24. The amplitude control signal 86 is a second voltage signal in this example. The attenuation to be applied to each first optical signal is proportional to the time delay to be applied by the respective optical ring resonator. The first optical signal 24 experiences loss, attenuation, during propagation through the optical ring resonator 92.

The amount of attenuation which the first optical signal experiences changes according to the time delay being applied. This is illustrated in FIG. 7, inset (a), which shows how the power transmission varies with the optical frequency of the first optical signal, and thus with the time delay being applied. The time delay controller 84 is arranged to control the variable optical attenuator to apply an appropriate attenuation to the first optical signal to ensure that a consistent total attenuation is applied to it by the VOA and the optical ring resonator. This ensures a stable amplitude of the electrical feed signal generated at the output of the photodiode 78.

A fundamental aspect of the feed signal generator 70 is that the amplitude of the second optical signal enables optical losses experienced by the delayed optical signal to be counteracted. If the delayed optical signal, P(t), and the modulated second optical signal, S(t), are represented as $$S(t) = E_s(t)\cos(\omega_s t + \phi_s)$$

$$P(t) = E_p \cos(\omega_p t + \phi_p)$$

with $E_s(t)$ representing the communications signal modulating the second optical signal, having the form $E_s(t) = a \cdot x(t)$, the current intensity at the photodiode 78 is given by:

$$I \propto \frac{|E_s(t)|^2 + E_p^2}{2} + \frac{|E_s(t)^2|}{2}\cos(2\omega_s t + 2\varphi_s) + \frac{E_p^2}{2}\cos(2\omega_p t) + E_s(t)E_p\cos[(\omega_s + \omega_p)t + \varphi] + E_s(t)E_p\cos[(\omega_s - \omega_p)t + \varphi]$$

where $\phi = (\omega_s - \omega_p)\Delta t$, in which $\Delta t$ is the time delay introduced by the ring resonator. Filtering out the base band and high frequency components, the term $$E_s(t)E_p \cos\lfloor(\omega_s - \omega_p)t + \phi\rfloor$$

remains.

The intensity of the modulated second optical signal can therefore be set to compensate for the attenuation experienced by the delayed optical signal, producing a photocurrent (the feed signal), resulting from the detection of the beating signal, with sufficient electrical levels to properly feed the PAA element.

The feed signal generator 70 uses a single optical ring resonator 92 per antenna element to generate the required delay for the feed signal for each antenna element. The optical ring resonator is tunable in order to generate a programmable time delay that corresponds to the time delay required to drive the respective PAA element. The wavelength (optical frequency) of the delayed optical signal can lie close to the resonance frequency of the respective optical ring resonator 92 in order to apply a significantly higher value of group delay than is possible with the described prior art and without the need to use cascaded ring resonators to cumulate sufficient chromatic dispersion. The prior art solutions cannot operate in this way because in those solutions the modulated optical signal is also transmitted through the optical ring resonator and can be distorted by the notch response of the ring resonator at the resonating frequency. In the feed signal generator 70 the extra-losses experienced during formation of the delayed optical signal due having the optical frequency of the first optical signal close to the resonance of the ring resonator are recovered in the resulting beating signal from the optical coupling of modulated second optical signal and the delayed optical signal.

Figure 8:
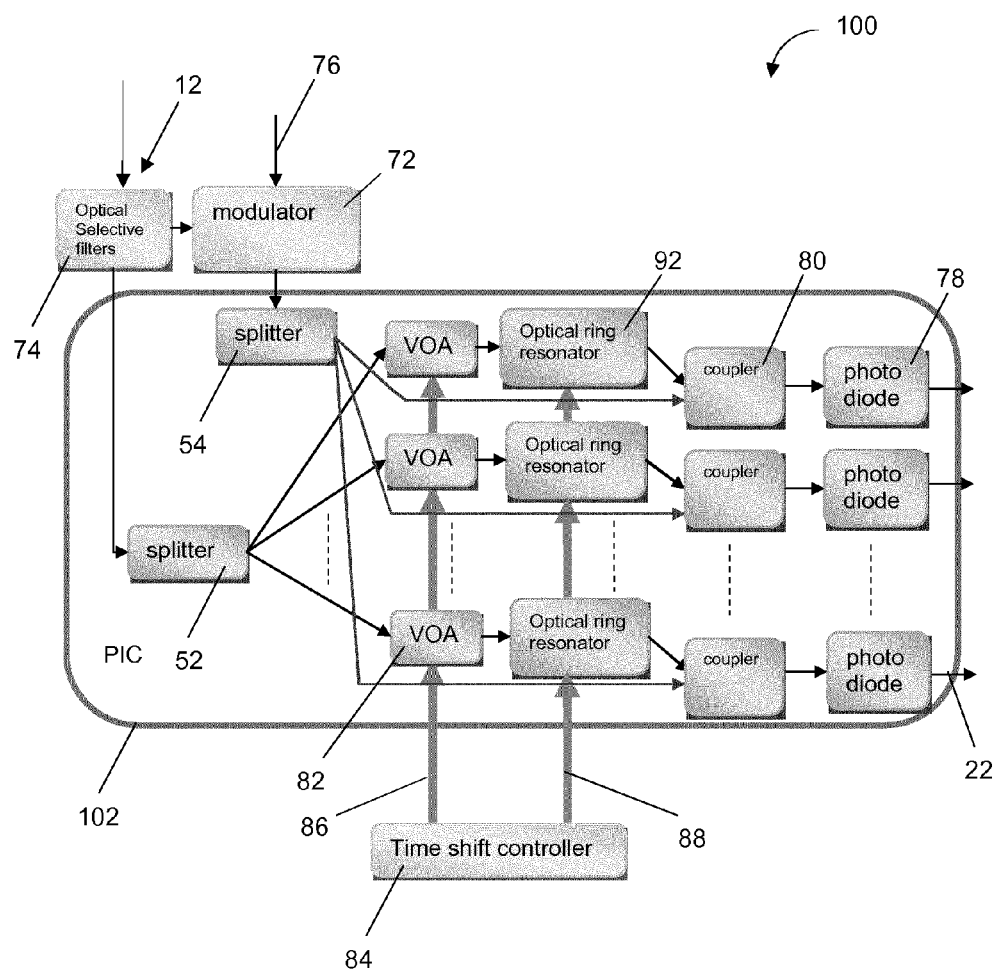
FIG. 8 is a schematic representation of a feed signal generator for a phased array antenna according to a seventh embodiment of the invention.

A seventh embodiment of the invention provides a feed signal generator 100 as shown in FIG. 8. The feed signal generator 100 of this embodiment is similar to the feed signal generator 70 of the previous embodiment, with the following modifications.

In this embodiment, the optical splitters 52, 54 and each of the VOAs 82, optical ring resonators 92, couplers 80 and photodiodes 78 are provided as a photonic integrated circuit, PIC, 102. The photonic integrated circuit comprises an array of even and odd optical waveguides. Each odd optical waveguide is coupled to a single VOA-optical ring resonator line and terminates in an optical coupler which is used to couple the delayed optical signal with the respective one of the second optical signals, which propagate on the even waveguides.

Figure 9:
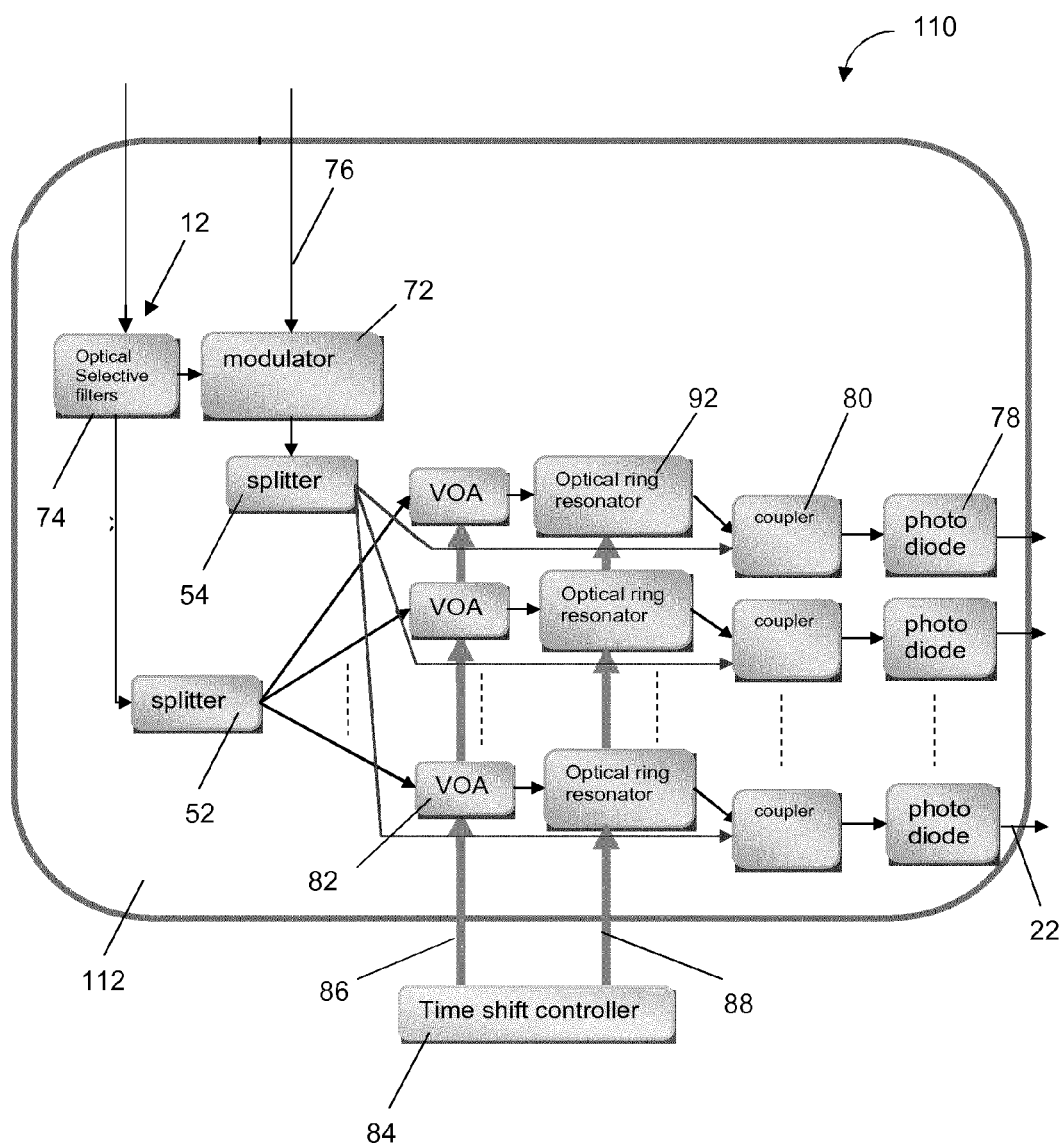
FIG. 9 is a schematic representation of a feed signal generator for a phased array antenna according to an eighth embodiment of the invention.

An eighth embodiment of the invention provides a feed signal generator 110 as shown in FIG. 9. The feed signal generator 110 of this embodiment is similar to the feed signal generator 100 of the previous embodiment, with the following modifications.

In this embodiment, the optical selective filters 74 and the optical modulator 72 are also provided as part of the photonic integrated circuit, PIC, 112.

Figure 10:
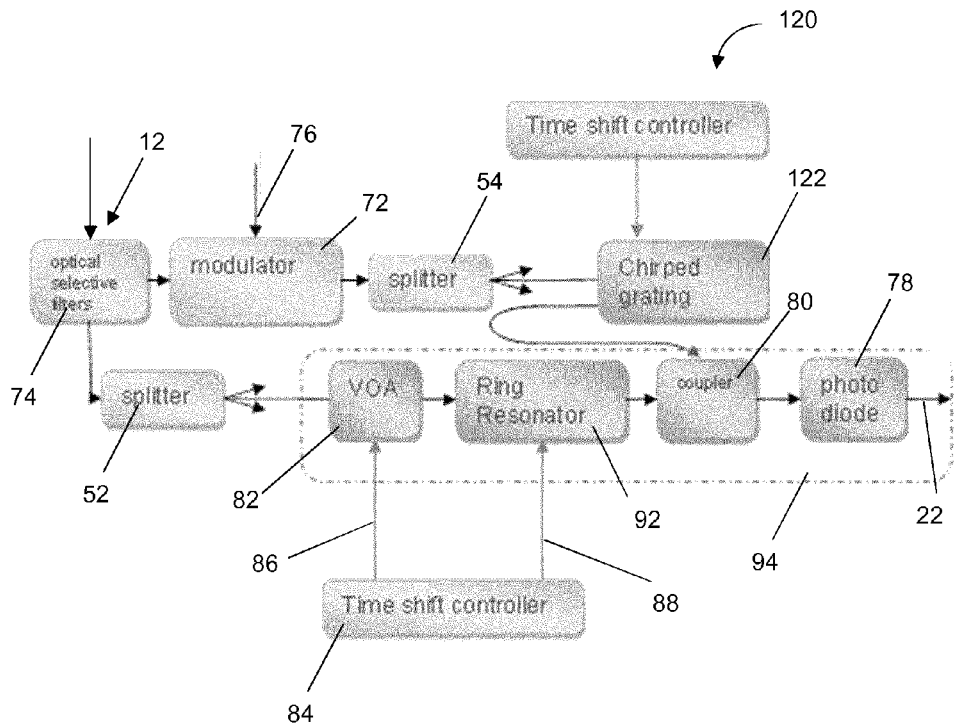
FIG. 10 is a schematic representation of a feed signal generator for a phased array antenna according to a ninth embodiment of the invention.

A ninth embodiment of the invention provides a feed signal generator 120 as shown in FIG. 10. The feed signal generator 120 of this embodiment is similar to the feed signal generator 70 of the sixth embodiment, shown in FIG. 6, with the following modifications.

The feed signal generator 120 additionally comprises a plurality of chirped Bragg gratings 122 provided in optical waveguides. Modulation of the second optical signal causes spectral broadening of the second optical signal, typically of around 1 GHz around the central optical frequency. Each chirped Bragg grating is arranged to apply a respective wavelength (optical frequency) dependent time delay to the various spectral components of the modulated second optical signal. An appropriate time delay can thereby be applied to each optical frequency in the modulated optical signal, so that at the heterodyning photodiode 78 all the spectral components in the modulated second optical signal have experienced the same time delay and therefore have the appropriate phase. This may mitigate beam squint in the resulting beam output by the PAA being driven by the feed signals 22.

Figure 11:
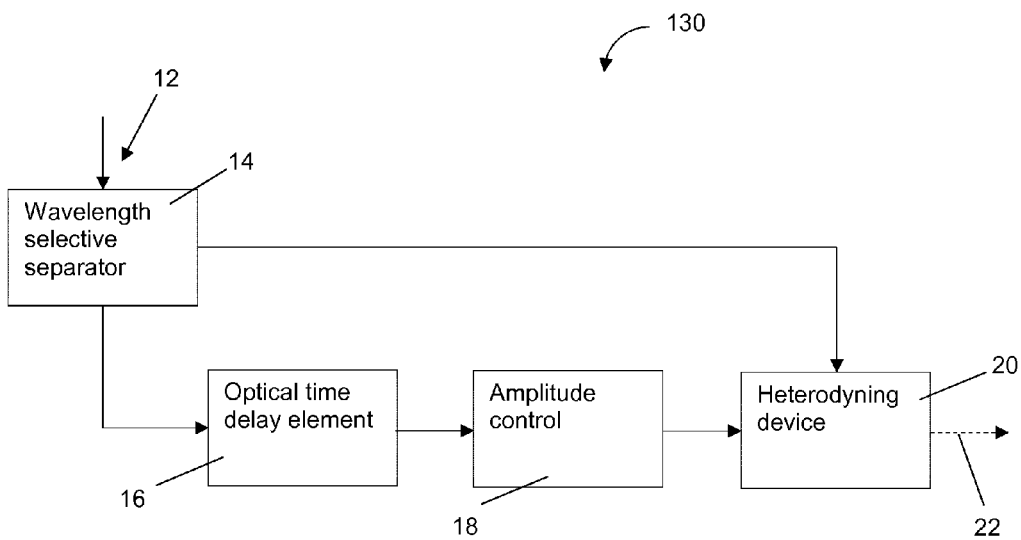
FIG. 11 is a schematic representation of a feed signal generator for a phased array antenna according to a tenth embodiment of the invention.

A tenth embodiment of the invention provides a feed signal generator 130 as shown in FIG. 11. The feed signal generator 130 of this embodiment is similar to the feed signal generator 10 of the first embodiment, shown in FIG. 1, with the following modifications.

In this embodiment, the optical amplitude control apparatus 18 is provided after the optical time delay element. It will be appreciated that the optical amplitude control apparatus 18 may similarly be provided after the optical time delay element in FIGS. 2 to 5.

Figure 12:
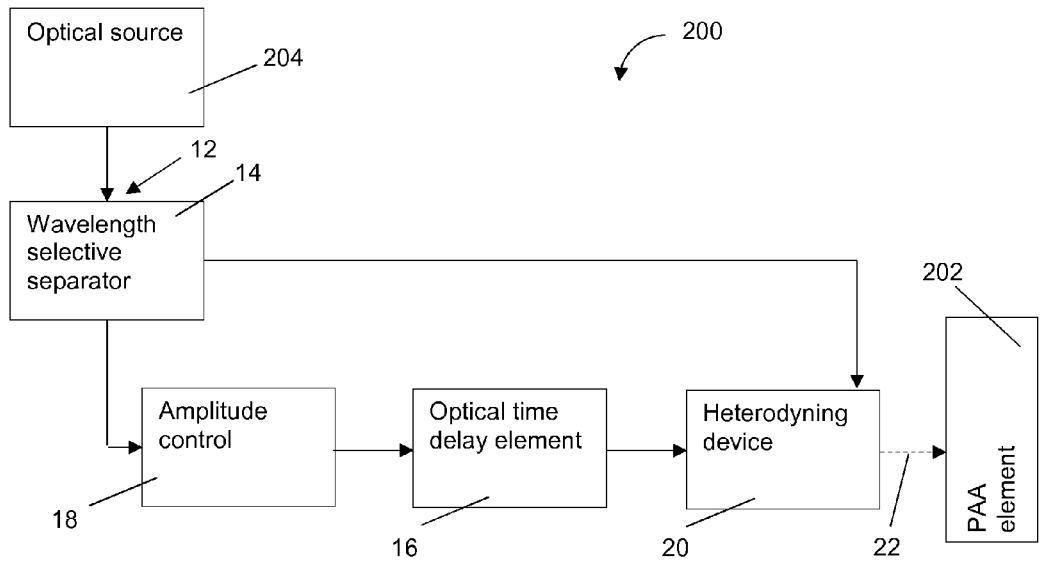
FIG. 12 is a schematic representation of a wireless communication network transmitter according to an eleventh embodiment of the invention.

Referring to FIG. 12, an eleventh embodiment of the invention provides a wireless communication network transmitter 200 comprising a phased array antenna, PAA, comprising a PAA element, 202, an optical source 204 and a feed signal generator 10 according to the first embodiment, shown in FIG. 1. The optical source 204 is arranged to provide the optical spectrum to the feed signal generator.

It will be appreciated that any of the feed signal generators 30, 40, 130 according to the second, third and tenth embodiments may alternatively be used.

Figure 13:
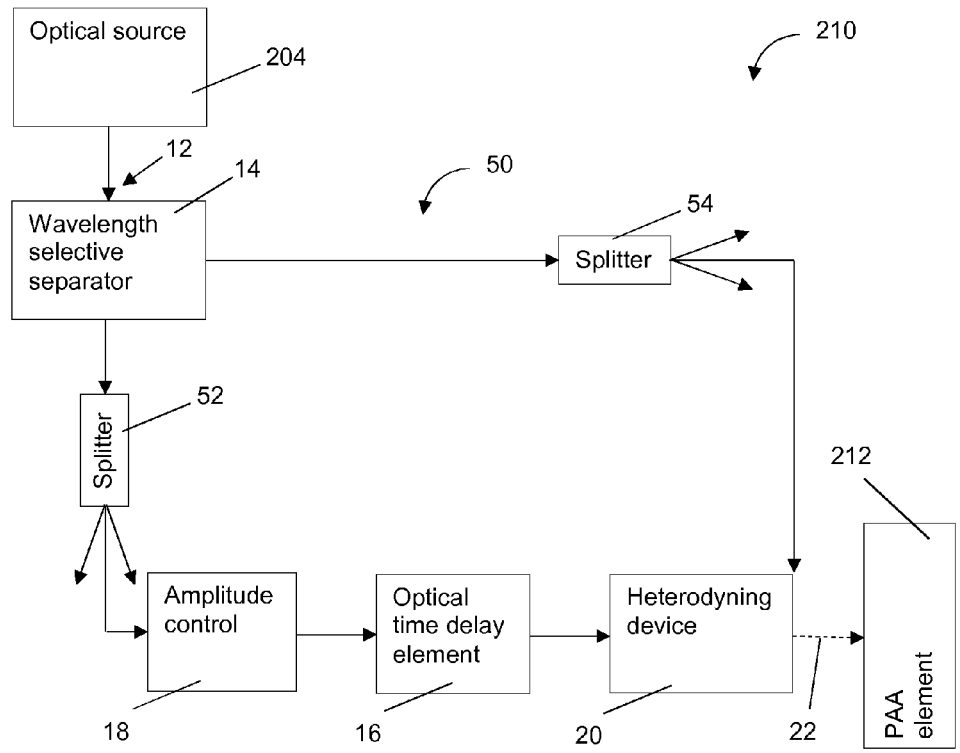
FIG. 13 is a schematic representation of a wireless communication network transmitter according to a twelfth embodiment of the invention.

A twelfth embodiment of the invention provides a wireless communication network transmitter 210 as shown in FIG. 13. The transmitter 210 of this embodiment is similar to the transmitter of the previous embodiment, with the following modifications. The same reference numbers are retained for corresponding features.

In this embodiment, the transmitter comprises a PAA comprising a plurality of PAA elements 212 and a feed signal generator 50 according to the fourth embodiment of the invention, shown in FIG. 1, is used to generate a respective feed signal for each element. It will be appreciated that the feed signal generator 60 according to the fifth embodiment may alternatively be used.

Figure 14:
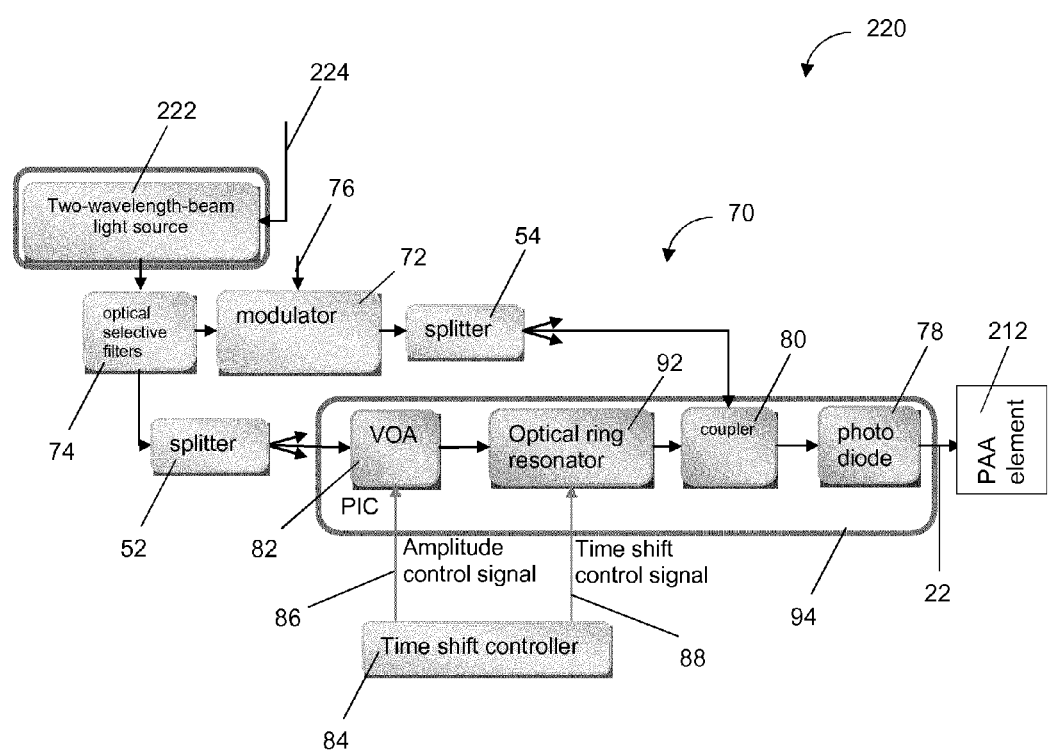
FIG. 14 is a schematic representation of a wireless communication network transmitter according to a thirteenth embodiment of the invention.

A thirteenth embodiment of the invention provides a wireless communication network transmitter 220 as shown in FIG. 14. The transmitter 220 of this embodiment is similar to the transmitter of the previous embodiment, with the following modifications. The same reference numbers are retained for corresponding features.

In this embodiment, a feed signal generator 70 according to the sixth embodiment of the invention, shown in FIG. 6, is used. The optical source is a two-wavelength light source 222. A preferred form of two-wavelength light source is a single mode laser arranged to generate a carrier optical signal and a Mach-Zehnder modulator arranged to modulate the carrier optical signal to generate first and second side bands, being the first and second phase-locked spectral components. The Mach-Zehnder modulator has a transfer function arranged to suppress onward transmission of the carrier optical signal. An alternative two-wavelength light source which may be used is a dual-wavelength mode-locked laser. It will be appreciated that any light source may be used which is able to generate two optical signals having two optical frequencies separated by a precise frequency difference and which are phase locked.

Figure 15:
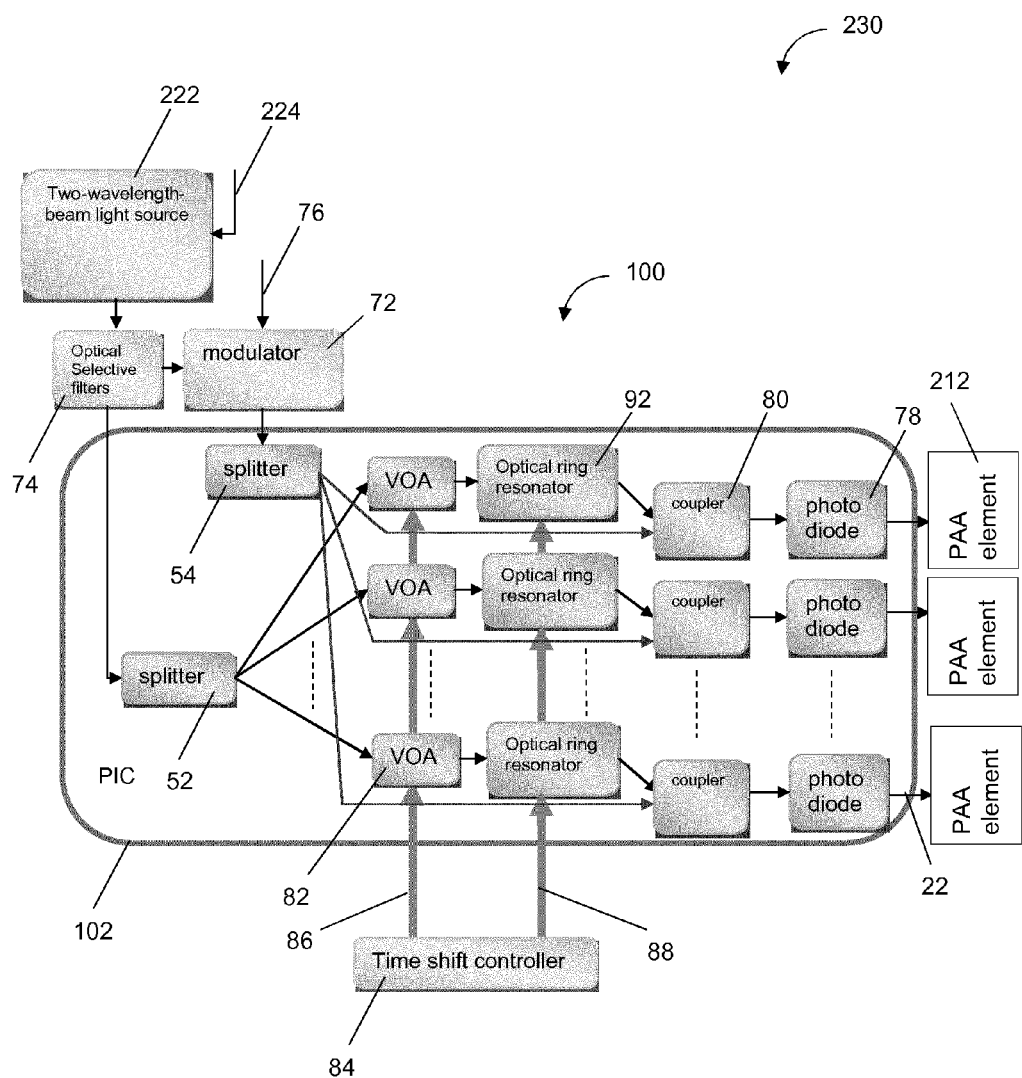
FIG. 15 is a schematic representation of a wireless communication network transmitter according to a fourteenth embodiment of the invention.

A fourteenth embodiment of the invention provides a wireless communication network transmitter 230 as shown in FIG. 15. The transmitter 230 of this embodiment is similar to the transmitter 220 of the previous embodiment, with the following modifications. The same reference numbers are retained for corresponding features.

In this embodiment, a feed signal generator 100 according to the seventh embodiment of the invention, shown in FIG. 8, is used.

Figure 16:
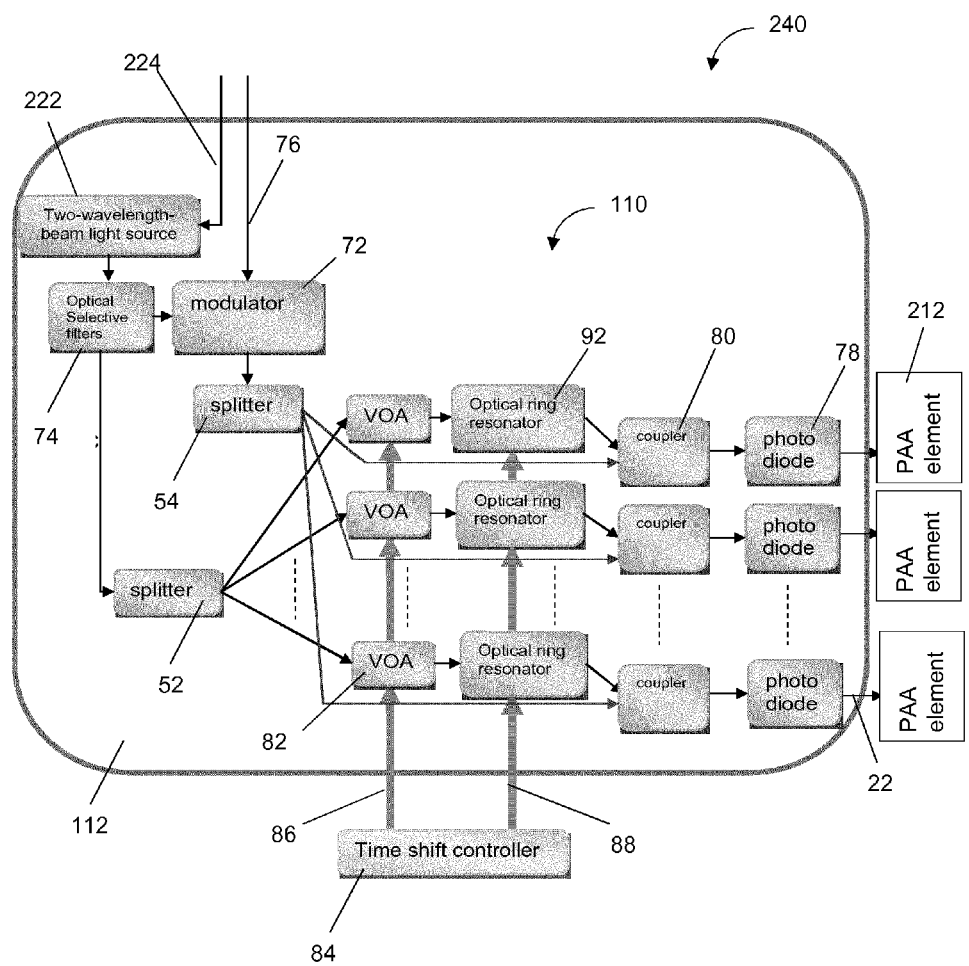
FIG. 16 is a schematic representation of a wireless communication network transmitter according to a fifteenth embodiment of the invention.

A fifteenth embodiment of the invention provides a wireless communication network transmitter 240 as shown in FIG. 16. The transmitter 240 of this embodiment is similar to the transmitter 230 of the fourteenth embodiment, with the following modifications. The same reference numbers are retained for corresponding features.

In this embodiment, a feed signal generator 110 according to the eighth embodiment of the invention, shown in FIG. 9, is used. The two-wavelength light source 222 is also provided as part of the PIC 112.

Figure 17:
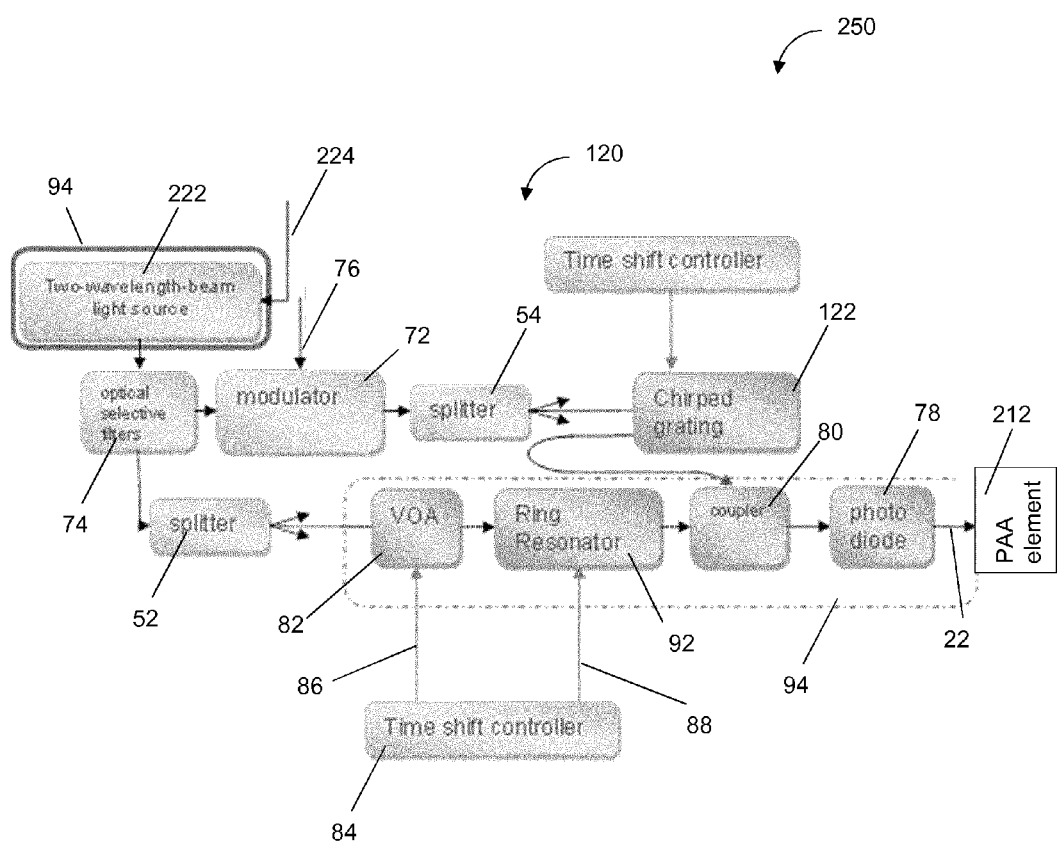
FIG. 17 is a schematic representation of a wireless communication network transmitter according to a sixteenth embodiment of the invention.

A sixteenth embodiment of the invention provides a wireless communication network transmitter 250 as shown in FIG. 17. The transmitter 250 of this embodiment is similar to the transmitter 220 of the thirteenth embodiment, with the following modifications. The same reference numbers are retained for corresponding features.

In this embodiment, a feed signal generator 120 according to the ninth embodiment of the invention, shown in FIG. 10, is used. The two-wavelength light source 222 is also provided as part of the PIC 94.

Figure 18:
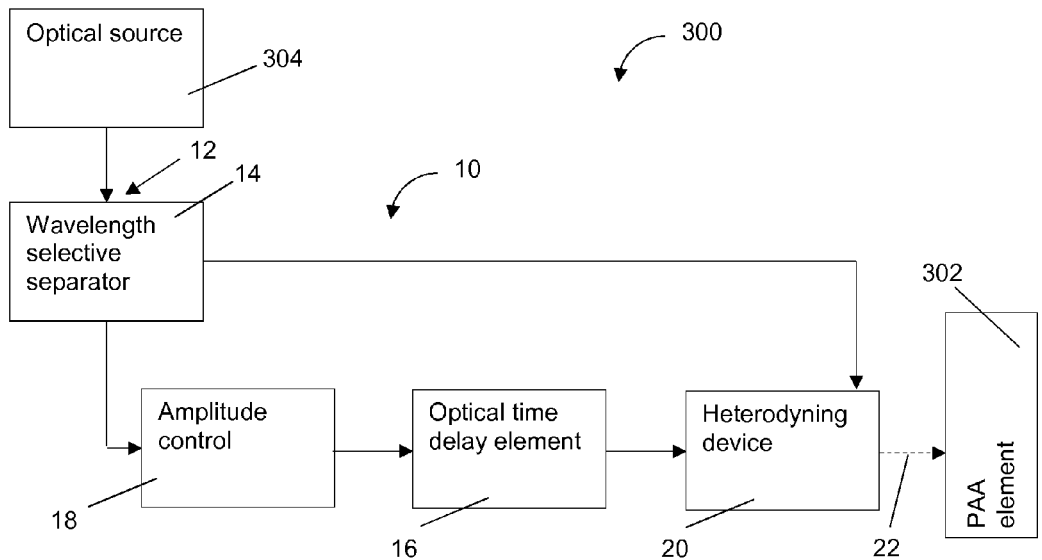
FIG. 18 is a schematic representation of a radar system according to a seventeenth embodiment of the invention.

Referring to FIG. 18, a seventeenth embodiment of the invention provides a radar system 300 comprising a phased array antenna, PAA, comprising a PAA element, 302, an optical source 304 and a feed signal generator 10 according to the first embodiment, shown in FIG. 1. The optical source 304 is arranged to provide the optical spectrum to the feed signal generator.

It will be appreciated that any of the feed signal generators 30, 40, 130 according to the second, third and tenth embodiments may alternatively be used.

Figure 19:
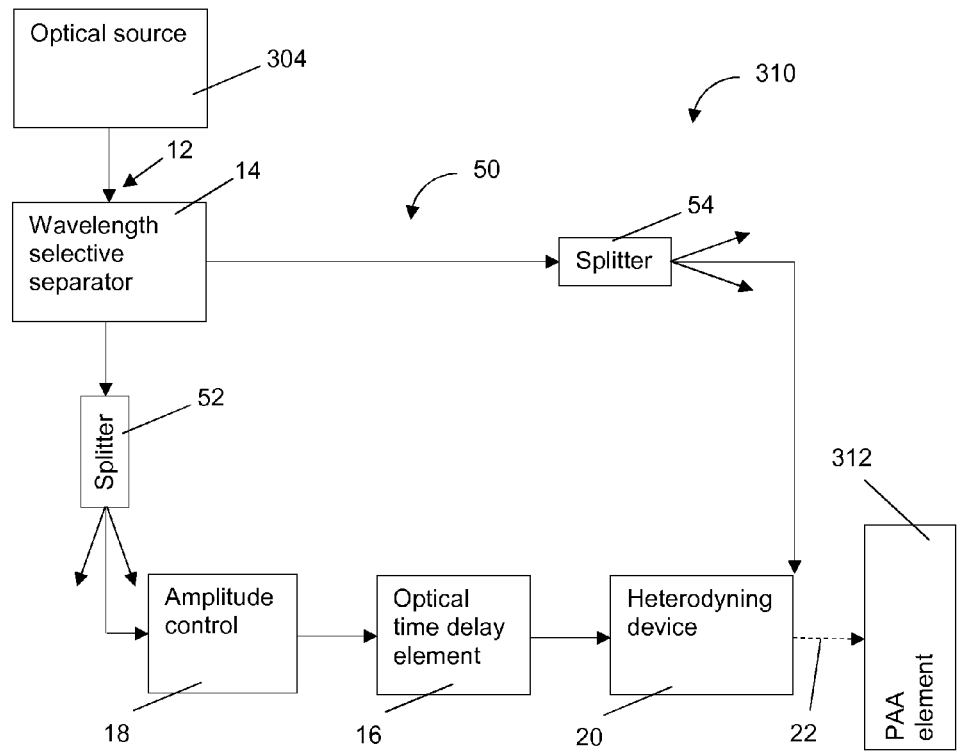
FIG. 19 is a schematic representation of a radar system according to an eighteenth embodiment of the invention.

An eighteenth embodiment of the invention provides a radar system 310 as shown in FIG. 19. The radar system 310 of this embodiment is similar to the radar system 300 of the previous embodiment, with the following modifications. The same reference numbers are retained for corresponding features.

In this embodiment, the radar system comprises a PAA comprising a plurality of PAA elements 312 and a feed signal generator 50 according to the fourth embodiment of the invention, shown in FIG. 1, is used to generate a respective feed signal for each PAA element. It will be appreciated that any of the feed signal generators 60, 70, 100, 110, 120 according to the fifth to ninth embodiments may alternatively be used.

Figure 20:
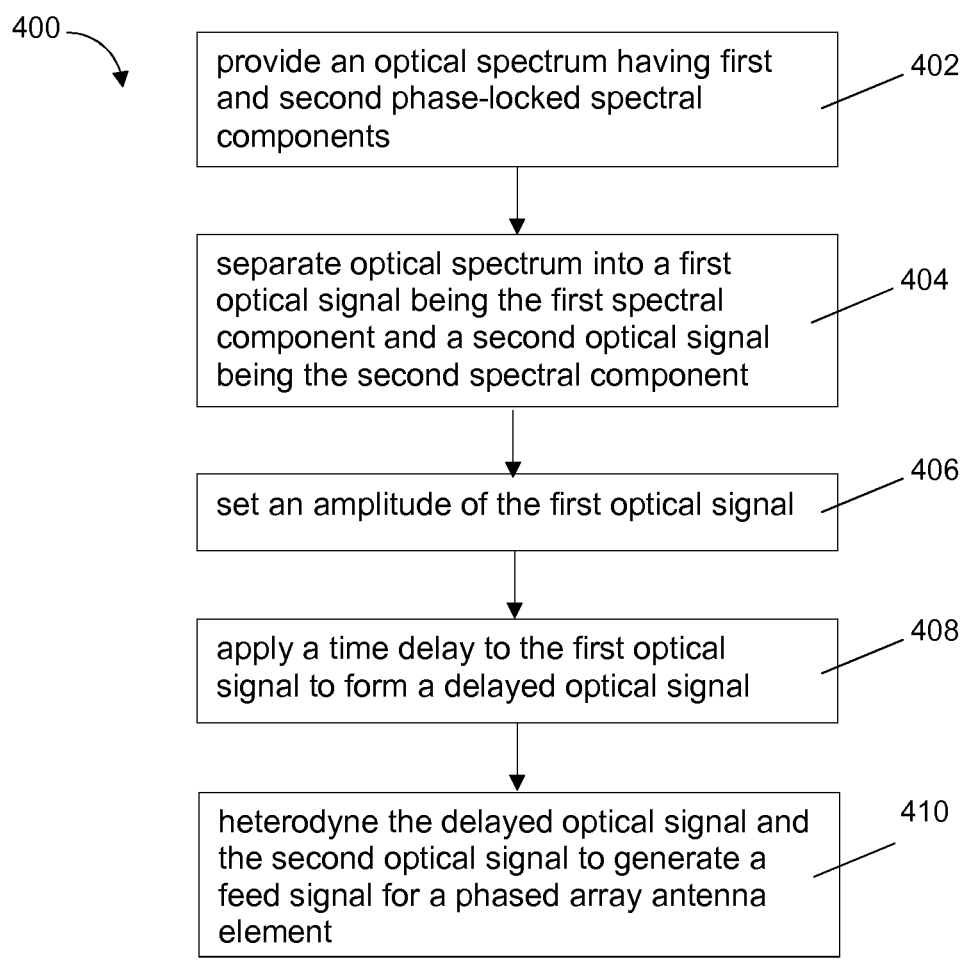
FIG. 20 shows the steps of a method according to a nineteenth embodiment of the invention of generating a feed signal for a phased array antenna.

Referring to FIG. 20, a nineteenth embodiment of the invention provides a method 400 of generating a feed signal for a phased array antenna. The phased array antenna, PAA, comprises a plurality of elements and the method 400 generates a feed signal for one of the PAA elements. The method comprises steps a. to e., as follows.

In step a., an optical spectrum having first and second phase-locked spectral components 402 is provided. The first spectral component has a first frequency and the second spectral component has a second frequency different to the first frequency by a preselected frequency difference. In step b., the optical spectrum is separated into a first optical signal, being the first spectral component, and a second optical signal, being the second spectral component 404. In step c., a time delay is applied to the first optical signal to form a delayed optical signal 408. In step d., an amplitude of the delayed optical signal is set. In this embodiment this is implemented by setting an amplitude of the first optical signal 406 prior to applying the time delay of step c.

In step e., the delayed optical signal and the second optical signal are heterodyned to generate a feed signal for the PAA element at the preselected frequency difference 410. The feed signal has a power proportional to a product of an amplitude of the second optical signal and the amplitude of the delayed optical signal and has a phase proportional to the time delay applied in forming the delayed optical signal. The method comprises setting the amplitude of the delayed optical signal such that the product of the amplitude of the second optical signal and the amplitude of the delayed optical signal causes the power of the feed signal to have a preselected value.

Figure 21:
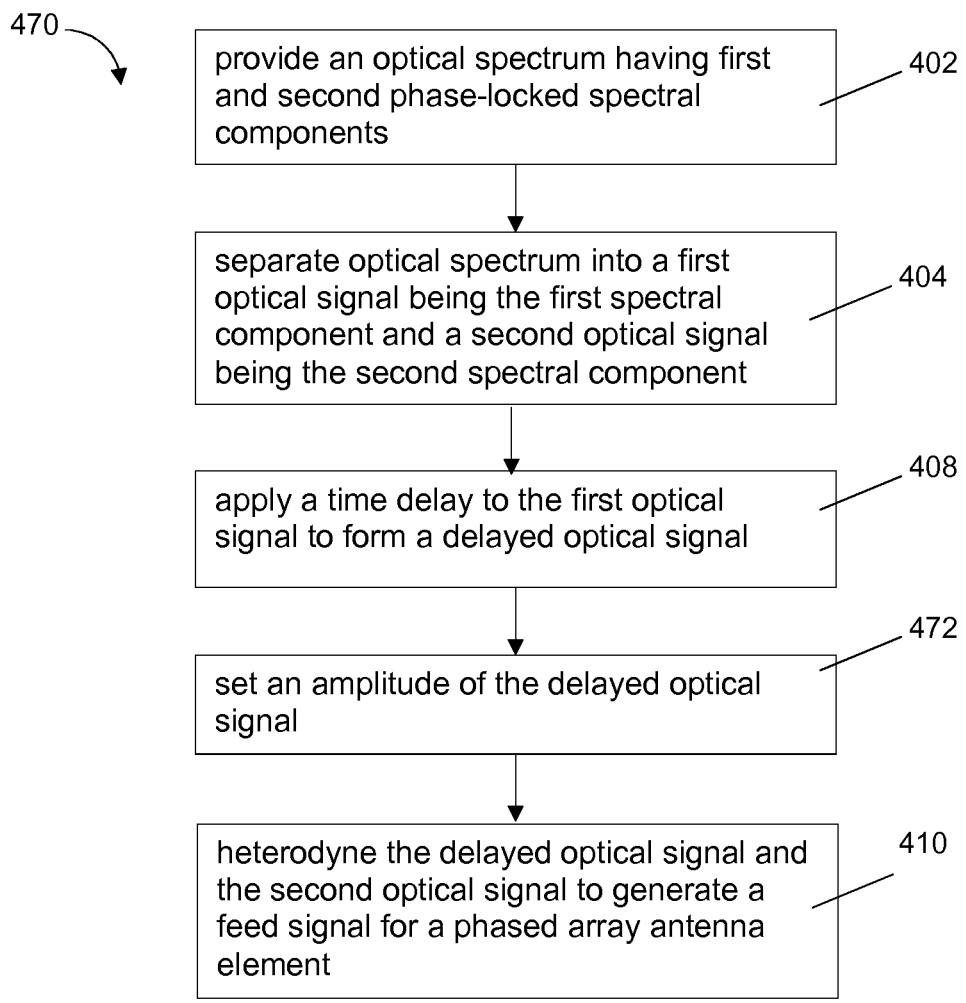
FIG. 21 shows the steps of a method according to a twentieth embodiment of the invention of generating a feed signal for a phased array antenna.

Referring to FIG. 21, a twentieth embodiment of the invention provides a method 470 of generating a feed signal for a phased array antenna. The method 470 of this embodiment is similar to the method 400 of the previous embodiment, with the following modifications. The same reference numbers are retained for corresponding steps.

In this embodiment, step d. is implemented by setting the amplitude of the delayed optical signal after it has been formed in step c.

Figure 22:
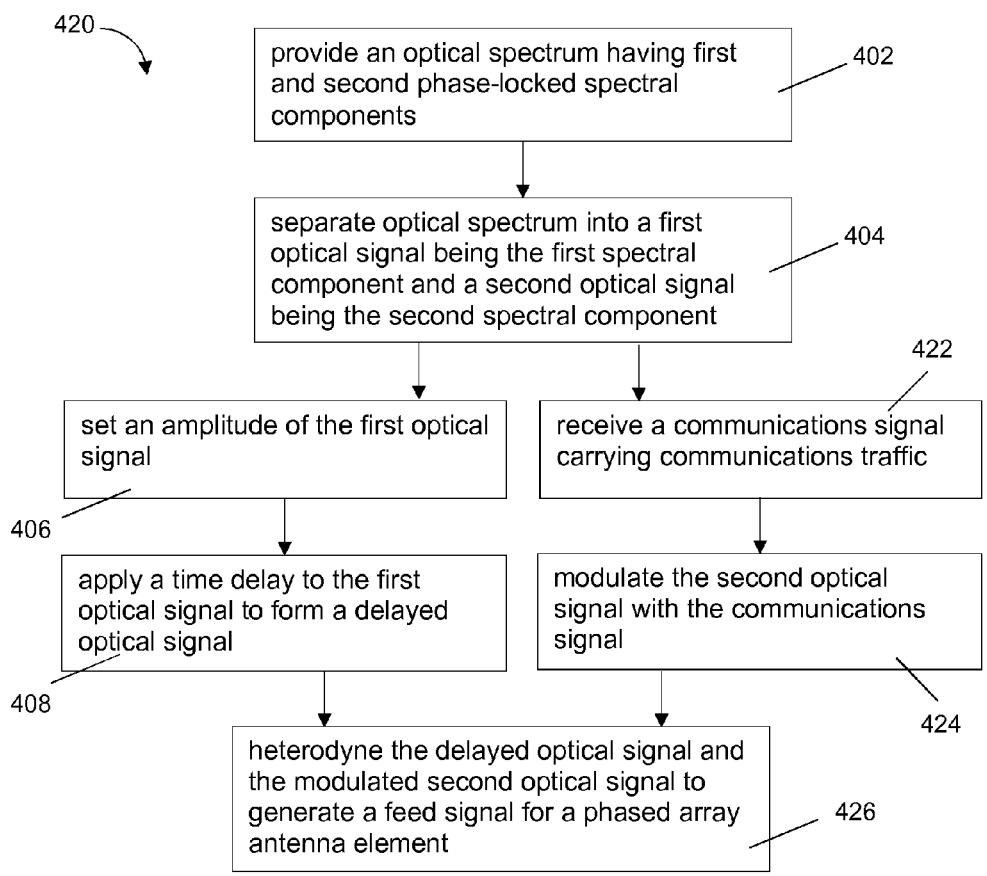
FIG. 22 shows the steps of a method according to a twenty-first embodiment of the invention of generating a feed signal for a phased array antenna.

Referring to FIG. 22, a twenty-first embodiment of the invention provides a method 420 of generating a feed signal for a phased array antenna. The method 420 of this embodiment is similar to the method 400 of the nineteenth embodiment, with the following modifications. The same reference numbers are retained for corresponding steps.

In this embodiment, the method 420 additionally comprises receiving a communications signal carrying communications traffic 422 and modulating the second optical signal with the communications signal 424. A modulated second optical signal carrying the communications traffic is thereby formed. The delayed optical signal is heterodyned with the modulated second optical signal to generate a feed signal carrying the communications traffic 426.

Figure 23:
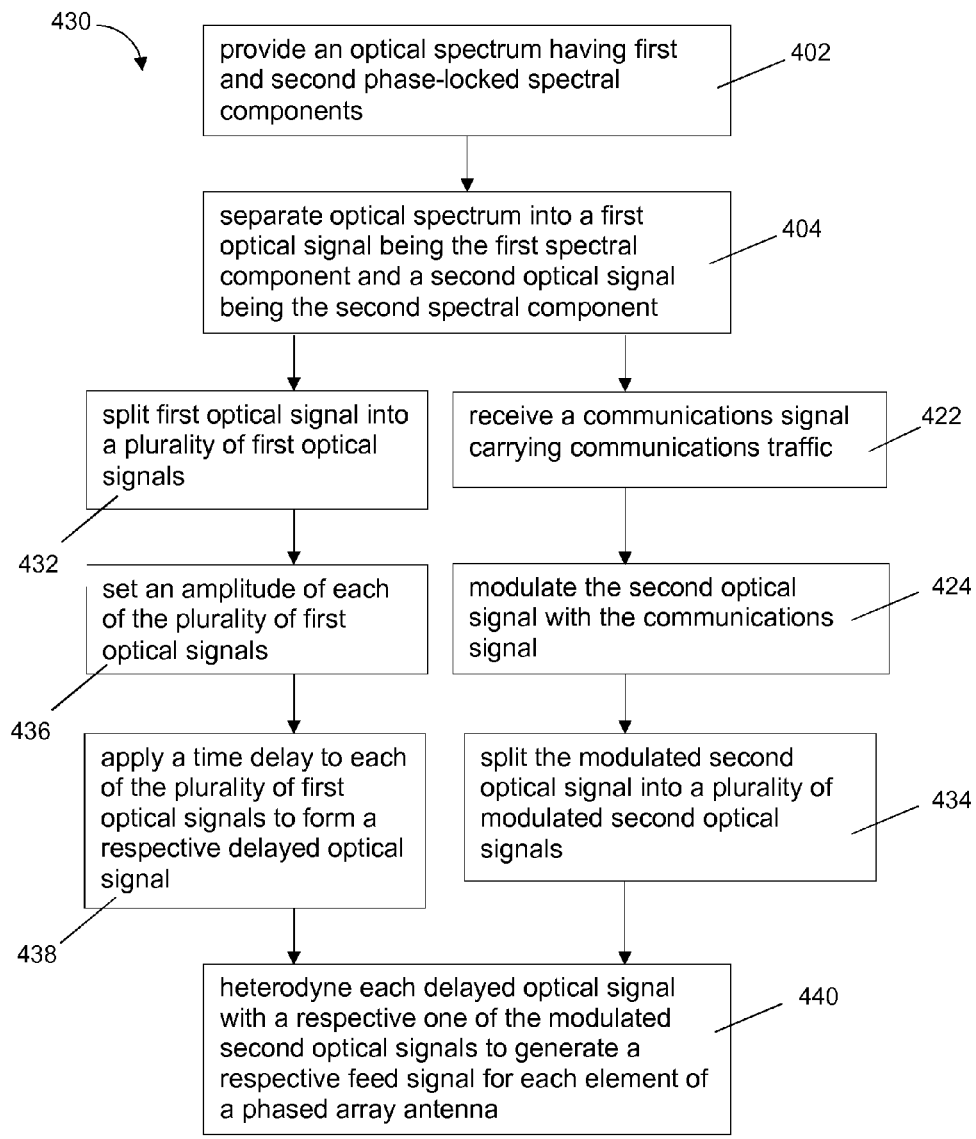
FIG. 23 shows the steps of a method according to a twenty-second embodiment of the invention of generating a feed signal for a phased array antenna.

Referring to FIG. 23, a twenty-second embodiment of the invention provides a method 430 of generating a feed signal for a phased array antenna. The phased array antenna comprises a plurality of PAA elements and the method generates feed signals for each of the PAA elements. The method 430 of this embodiment is similar to the method 420 of the previous embodiment, with the following modifications. The same reference numbers are retained for corresponding steps.

In this embodiment, the first optical signal is split into a plurality of first optical signals 432 and the modulated second optical signal is split into a plurality of modulated second optical signals 434. The setting of the amplitude of each of the plurality of delayed optical signals is implemented by setting the amplitude of each of the plurality of first optical signals. In step c., a respective time delay is applied to each of the plurality of first optical signals to form a respective delayed optical signal 438.

In step e., each of the plurality of delayed optical signals is heterodyned with a respective one of the plurality of modulated second optical signals to generate a respective feed signal 440 for a respective one of the PAA elements. Each feed signal has a respective phase proportional to the time delay which was applied during formation of the respective delayed optical signal. The amplitude of each delayed optical signal is set such that the power of each feed signal is caused to have the preselected value.

Figure 24:
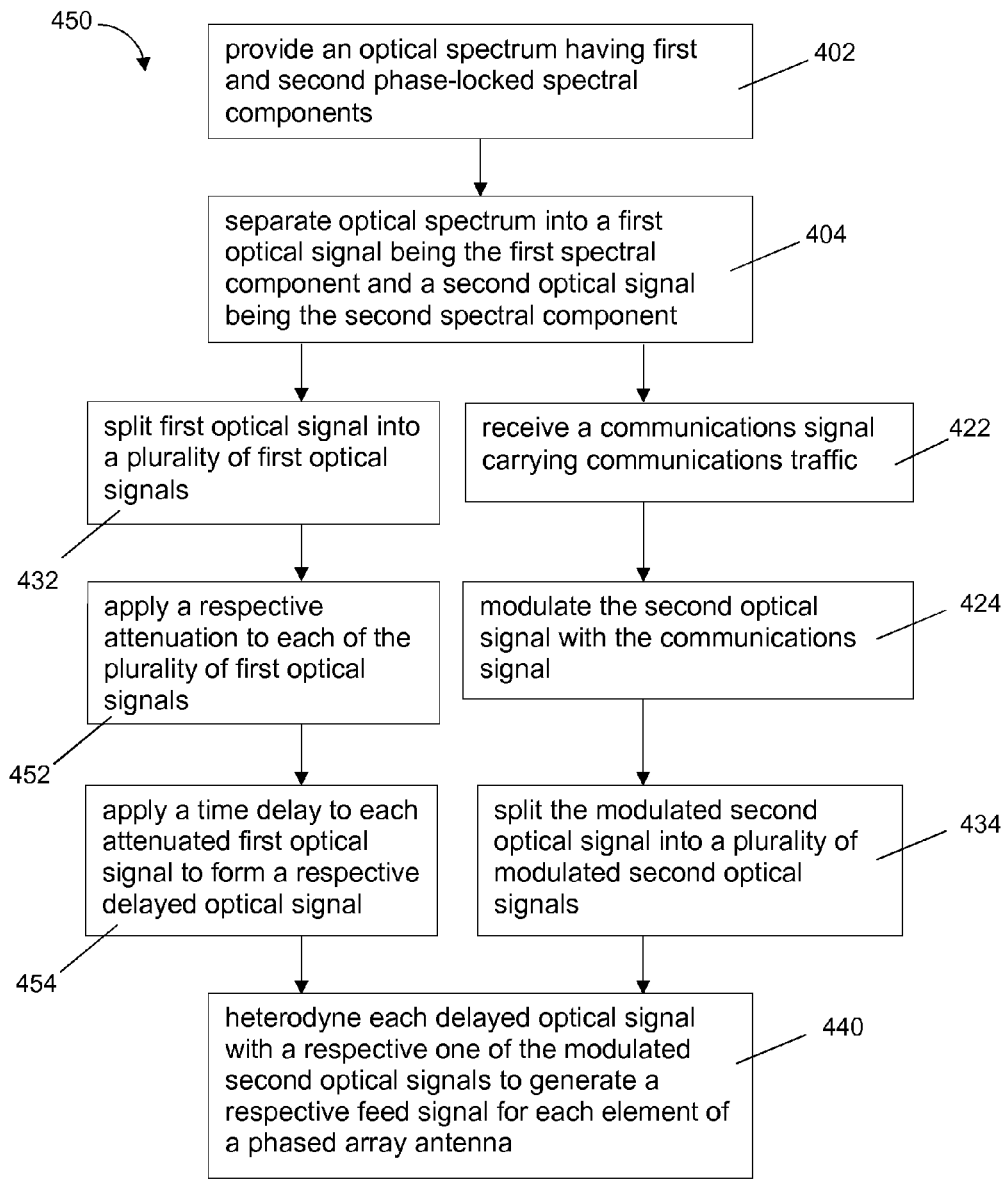
FIG. 24 shows the steps of a method according to a twenty-third embodiment of the invention of generating a feed signal for a phased array antenna.

Referring to FIG. 24, a twenty-third embodiment of the invention provides a method 450 of generating a feed signal for a phased array antenna. The phased array antenna comprises a plurality of antenna elements and the method generates feed signals for each of the PAA elements. The method 450 of this embodiment is similar to the method 430 of the previous embodiment, with the following modifications. The same reference numbers are retained for corresponding steps.

In this embodiment, the amplitude of each delayed optical signal is set by applying a respective attenuation 452 to the respective one of the plurality of first optical signals. The attenuation that is applied may be varied and is set such that the total attenuation acquired by each delayed optical signal is consistent. A time delay is applied to each attenuated first optical signal to form the respective delayed optical signal 454.

Figure 25:
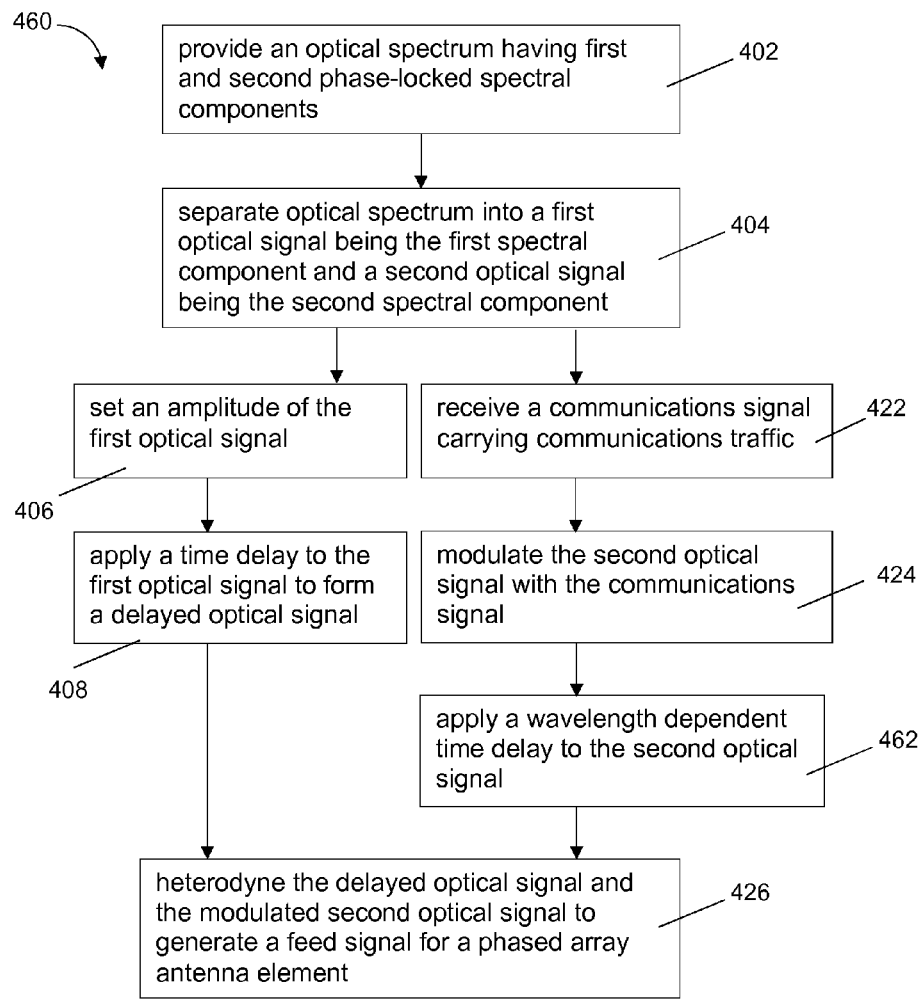
FIG. 25 shows the steps of a method according to a twenty-fourth embodiment of the invention of generating a feed signal for a phased array antenna.

Referring to FIG. 25, a twenty-fourth embodiment of the invention provides a method 460 of generating a feed signal for a phased array antenna. The phased array antenna comprises a plurality of antenna elements and the method generates a feed signal for one of the PAA elements. The method 460 of this embodiment is similar to the method 420 of the twenty-first embodiment, shown in FIG. 22, with the following modifications. The same reference numbers are retained for corresponding steps.

The method 460 additionally comprises, after modulating the second optical signal with the communications signal, applying a wavelength dependent time delay to the second optical signal 462.

The invention claimed is:

1. A feed signal generator for a phased array antenna, the feed signal generator comprising:
   an input arranged to receive an optical spectrum having first and second phase-locked spectral components, the first spectral component having a first frequency and the second spectral component having a second frequency different to the first frequency by a preselected frequency difference;

wavelength selective separator apparatus arranged to separate the optical spectrum into a first optical signal being the first spectral component and a second optical signal being the second spectral component;

an optical time delay element arranged to apply a time delay to the first optical signal to form a delayed optical signal;

optical amplitude control apparatus arranged to set an amplitude of the delayed optical signal; and a heterodyning device arranged to heterodyne the delayed optical signal and the second optical signal to generate a feed signal for the phased array antenna at the preselected frequency difference, the feed signal having a power proportional to a product of an amplitude of the second optical signal and the amplitude of the delayed optical signal and having a phase proportional to said time delay; wherein the optical amplitude control apparatus is arranged to set the amplitude of the delayed optical signal such that the product of the amplitude of the second optical signal and the amplitude of the delayed optical signal causes the power of the feed signal to have a preselected value.

2. A feed signal generator for a phased array antenna as claimed in claim 1, further comprising an optical modulator arranged to receive a communications signal carrying communications traffic and the optical modulator arranged to modulate the second optical signal with the communications signal, such that the second optical signal carries the communications traffic.

3. A feed signal generator as claimed in claim 2, further comprising a chirped Bragg grating in an optical waveguide, the chirped Bragg grating being arranged to apply a wavelength dependent time delay to the second optical signal output from the optical modulator.

4. A feed signal generator for a phased array antenna as claimed in claim 1, wherein the optical time delay element is one of an optical ring resonator and a chirped Bragg grating in an optical waveguide.

5. A feed signal generator for a phased array antenna as claimed in claim 1, comprising:
a first optical splitter arranged to split the first optical signal into a plurality of first optical signals;
a second optical splitter arranged to split the second optical signal into a plurality of second optical signals;
a plurality of said optical time delay elements each arranged to apply a respective time delay to a respective one of said plurality of first optical signals to form a respective delayed optical signal;
a plurality of said optical amplitude control apparatus each arranged to set an amplitude of a respective delayed optical signal; and
a plurality of said heterodyning devices each arranged to heterodyne a respective delayed optical signal and a respective one of said plurality of second optical signals to generate a respective feed signal at said preselected frequency difference for a respective one of a plurality of antenna elements of the phased array antenna, each feed signal having a respective phase proportional to the respective time delay; wherein each optical amplitude control apparatus is arranged to set the amplitude of the respective delayed optical signal such that the respective power of each feed signal is caused to have the preselected value.

6. A feed signal generator for a phased array antenna as claimed in claim 5, wherein each optical time delay element is a variable optical time delay element, such that the time delay applied by each optical time delay element may be varied, and each
optical amplitude control apparatus is variable to set the amplitude of the respective delayed optical signal such that the power of each feed signal is maintained at the preselected value.

7. A feed signal generator for a phased array antenna as claimed in claim 6, wherein
each optical amplitude control apparatus is a variable optical attenuator arranged to apply a variable optical attenuation to the respective first optical signal such that each delayed optical signal has a consistent total attenuation applied to it by the respective optical attenuator and the respective optical time delay element.

8. A feed signal generator for a phased array antenna as claimed in claim 7, wherein each variable optical attenuator is provided before the respective optical time delay element.

9. A wireless communication network transmitter comprising:
a phased array antenna;
an optical source arranged to provide an optical spectrum having first and second phase-locked spectral components, the first said spectral component having a first frequency and the second said spectral component having a second frequency different to the first frequency by a preselected frequency difference; and
a feed signal generator for the phased array antenna, as claimed in claim 1.

10. A radar system comprising:
a phased array antenna;
an optical source arranged to provide an optical spectrum having first and second phase-locked spectral components, the first said spectral component having a first frequency and the second said spectral component having a second frequency different to the first frequency by a preselected frequency difference; and
a feed signal generator for the phased array antenna, as claimed in claim 1.

11. A method of generating a feed signal for a phased array antenna, the method comprising the steps of:
a. providing an optical spectrum having first and second phase-locked spectral components, the first spectral component having a first frequency and the second spectral component having a second frequency different to the first frequency by a preselected frequency difference;
b. separating the optical spectrum into a first optical signal being the first spectral component and a second optical signal being the second spectral component;
c. applying a time delay to the first optical signal to form a delayed optical signal;
d. setting an amplitude of the delayed optical signal; and
e. heterodyning the delayed optical signal and the second optical signal to generate a feed signal for the phased array antenna at the preselected frequency difference, the feed signal having a power proportional to a product of an amplitude of the second optical signal and the amplitude of the delayed optical signal and having a phase proportional to said time delay; wherein the amplitude of the delayed optical signal is set such that the product of the amplitude of the second optical signal and the amplitude of the delayed optical signal causes the power of the feed signal to have a preselected value.

12. A method as claimed in claim 11, further comprising, before step e., receiving a communications signal carrying communications traffic and modulating the second optical signal with the communications signal, such that the second optical signal carries the communications traffic.

13. A method as claimed in claim 12, further comprising, after modulating the second optical signal with the communications signal, applying a wavelength dependent time delay to the second optical signal.

14. A method as claimed in claim 11, wherein in step c. the time delay is applied to the first optical signal using one of an optical ring resonator and a chirped Bragg grating in an optical waveguide.

15. A method as claimed in claim 11, wherein:

after step b., the first optical signal is split into a plurality of first optical signals and the second optical signal is split into a plurality of second optical signals;

in step c., a respective time delay is applied to each of the plurality of first optical signals to form a respective delayed optical signal;

step d., comprises setting a respective amplitude of each delayed optical signal;

in step e., each delayed optical signal is heterodyned with a respective one of the plurality of second optical signals to generate a respective feed signal at the preselected frequency difference for a respective one of a plurality of antenna elements of the phased array antenna, each feed signal having a respective phase proportional to the respective time delay;

and wherein in step d., the respective amplitude of each delayed optical signal is set such that the respective power of each feed signal is caused to have the preselected value.

16. A method as claimed in claim 11, wherein in step d. the amplitude of each delayed optical signal is set by applying a respective attenuation, the attenuation is variable and is set such that the total attenuation acquired by each delayed optical signal is consistent.

* * * * *